US012314003B2

(12) United States Patent
Noguchi et al.

(10) Patent No.: US 12,314,003 B2
(45) Date of Patent: May 27, 2025

(54) ELECTROSTATIC IMAGE DEVELOPING TONER AND ELECTROSTATIC IMAGE DEVELOPER

(71) Applicant: FUJIFILM Business Innovation Corp., Tokyo (JP)

(72) Inventors: Daisuke Noguchi, Kanagawa (JP); Yoshimasa Fujihara, Kanagawa (JP); Atsushi Sugawara, Kanagawa (JP); Shintaro Anno, Kanagawa (JP); Satoshi Miura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 726 days.

(21) Appl. No.: 17/514,497

(22) Filed: Oct. 29, 2021

(65) Prior Publication Data

US 2022/0382178 A1 Dec. 1, 2022

(30) Foreign Application Priority Data

May 25, 2021 (JP) ................................ 2021-087878

(51) Int. Cl.
*G03G 9/08* (2006.01)
*G03G 9/087* (2006.01)
*G03G 9/09* (2006.01)

(52) U.S. Cl.
CPC ....... *G03G 9/08728* (2013.01); *G03G 9/0823* (2013.01); *G03G 9/08782* (2013.01); *G03G 9/09* (2013.01)

(58) Field of Classification Search
None
See application file for complete search history.

(56) References Cited

U.S. PATENT DOCUMENTS

| | | | | |
|---|---|---|---|---|
| 7,160,663 | B2 | 1/2007 | Komoto et al. | |
| 2005/0069802 | A1 * | 3/2005 | Hirose | G03G 9/08728 430/109.3 |
| 2007/0196758 | A1 | 8/2007 | Sasaki et al. | |
| 2013/0252156 | A1 | 9/2013 | Kamiwaki et al. | |

FOREIGN PATENT DOCUMENTS

| | | | | |
|---|---|---|---|---|
| EP | 1930781 | A2 * | 6/2008 | G03G 9/0827 |
| JP | 2003098858 | A * | 4/2003 | |
| JP | 2005-062807 | A | 3/2005 | |
| JP | 2005-107089 | A | 4/2005 | |

(Continued)

OTHER PUBLICATIONS

JP-2011209313-A Translation (Year: 2024).*

(Continued)

*Primary Examiner* — Peter L Vajda
*Assistant Examiner* — Charles Collins Sullivan, IV
(74) *Attorney, Agent, or Firm* — Sughrue Mion, PLLC

(57) ABSTRACT

An electrostatic image developing toner includes a toner particle including a binder resin and a colorant. The net intensity $N_S$ of sulfur included in the toner particle and the total net intensity $N_A$ of an alkali metal and an alkaline-earth metal included in the toner particle, which are measured by X-ray fluorescence analysis, satisfy $1.0<N_S/N_A<22.0$.

14 Claims, 2 Drawing Sheets

(56) References Cited

FOREIGN PATENT DOCUMENTS

| | | | | |
|---|---|---|---|---|
| JP | 2010-181802 | A | | 8/2010 |
| JP | 2011140590 | A | * | 7/2011 |
| JP | 2011209313 | A | * | 10/2011 |
| JP | 2013-130794 | A | | 7/2013 |
| JP | 2016-110139 | A | | 6/2016 |
| JP | 2017167440 | A | * | 9/2017 |
| JP | 2017-203890 | A | | 11/2017 |
| JP | 2018-025723 | A | | 2/2018 |
| JP | 2018-180279 | A | | 11/2018 |

OTHER PUBLICATIONS

JP-2003098858-A Translation (Year: 2024).*
JP-2017167440-A Translation (Year: 2024).*
JP-2011140590-A Translation (Year: 2024).*
Extended European Search Report dated Jun. 2, 2022 in European Application No. 21211641.2.
Japanese Office Action dated Oct. 15, 2024 in Application No. 2021-087878.

* cited by examiner

ELECTROSTATIC IMAGE DEVELOPING TONER AND ELECTROSTATIC IMAGE DEVELOPER

CROSS-REFERENCE TO RELATED APPLICATIONS

This application is based on and claims priority under 35 USC 119 from Japanese Patent Application No. 2021-087878 filed May 25, 2021.

BACKGROUND

(i) Technical Field

The present disclosure relates to an electrostatic image developing toner and an electrostatic image developer.

(ii) Related Art

Methods for visualizing image information, such as electrophotography, have been used in various fields. In electrophotography, an electrostatic image is formed, as image information, on the surface of an image holding member by charging and electrostatic image formation. Subsequently, a toner image is formed on the surface of the image holding member with a developer including a toner. The toner image is transferred to a recording medium and then fixed to the recording medium. Through the above steps, image information is visualized as an image.

For example, Japanese Laid Open Patent Application Publication No. 2005-62807 discloses a toner that includes toner particles including at least a binder resin, a colorant, a release agent, and a resin including a sulfur atom and an inorganic fine powder included in the toner particles, wherein i) the toner particles include at least one element selected from the group consisting of magnesium, calcium, barium, zinc, aluminum, and phosphorus and satisfy the following condition: 4≤(Total content T [ppm] of the above elements)/(Content S [ppm] of sulfur)≤30; ii) the weight average particle size D4 of the toner is 3 to 10 μm; and iii) the average circularity of the toner is 0.950 to 0.995.

Japanese Laid Open Patent Application Publication No. 2010-181802 discloses a toner including core particles including at least a binder resin, a colorant, and a release agent and a coating layer covering the core particles, wherein the coating layer is formed by causing resin microparticles to adhere onto the surfaces of the core particles after the formation of the core particles, wherein the difference Tg2−Tg1 [° C.] between the glass transition temperature Tg1 [° C.] of the core particles and the glass transition temperature Tg2 [° C.] of the resin microparticles is 5° C. to 40° C., wherein the resin microparticles are composed of a resin including at least a carboxyl group and a sulfonic group, and wherein the sulfur content in the coating layer is 0.005% to 0.050% by mass of the amount of toner particles.

Japanese Laid Open Patent Application Publication No. 2011-209313 discloses an electrostatic latent image developing toner that includes toner particles including a binder resin, sulfur, and an element selected from Al and Mg, wherein the net intensity Cs [kcps] of sulfur included in the toner particles which is measured by X-ray fluorescence (XRF) analysis and the net intensity Cm [kcps] of the element selected from Al and Mg and included in the toner particles which is measured by XRF analysis satisfy the relationship (1): 0.2<Cm<0.4, and the relationship (2): 4.5<Cs/Cm<5.5.

Japanese Laid Open Patent Application Publication No. 2013-130794 discloses a clear toner having a volume average primary particle size of 18 μm or more and 28 μm or less, wherein the sulfur content (i.e., compositional ratio) in the toner which is measured by XRF is 0.01% or more and 0.1% or less.

Japanese Laid Open Patent Application Publication No. 2018-25723 discloses an electrostatic image developing toner that includes toner particles including a binder resin and a release agent, wherein the sulfur content B in domains of the release agent which is determined by analyzing cross sections of the toner particles with an energy-dispersive X-ray spectroscopy (EDX) device is 0.2 atom % or more and 1.5 atom % or less.

Japanese Laid Open Patent Application Publication No. 2018-180279 discloses an electrostatic image developing toner that includes toner matrix particles and an external additive deposited on the surfaces of the toner matrix particles, wherein the external additive includes at least silica particles and the silica particles include sulfur.

SUMMARY

Aspects of non-limiting embodiments of the present disclosure relate to an electrostatic image developing toner that may enable formation of a secondary color image having a wide color gamut, compared with a toner that includes toner particles including a binder resin and a colorant, wherein the net intensity $N_S$ of sulfur included in the toner particles and the total net intensity $N_A$ of alkali metals and alkaline-earth metals included in the toner particles, the net intensity $N_S$ and the net intensity $N_A$ being measured by X-ray fluorescence analysis, satisfy $15 \leq N_S/N_A$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developing toner including a toner particle including a binder resin and a colorant, wherein a net intensity $N_S$ of sulfur included in the toner particle and a total net intensity $N_A$ of an alkali metal and an alkaline-earth metal included in the toner particle, the net intensity $N_S$ and the net intensity $N_A$ being measured by X-ray fluorescence analysis, satisfy $1.0 < N_S/N_A < 22.0$.

BRIEF DESCRIPTION OF THE DRAWINGS

Exemplary embodiments of the present disclosure will be described in detail based on the following figures, wherein.

DETAILED DESCRIPTION

Figure 1:
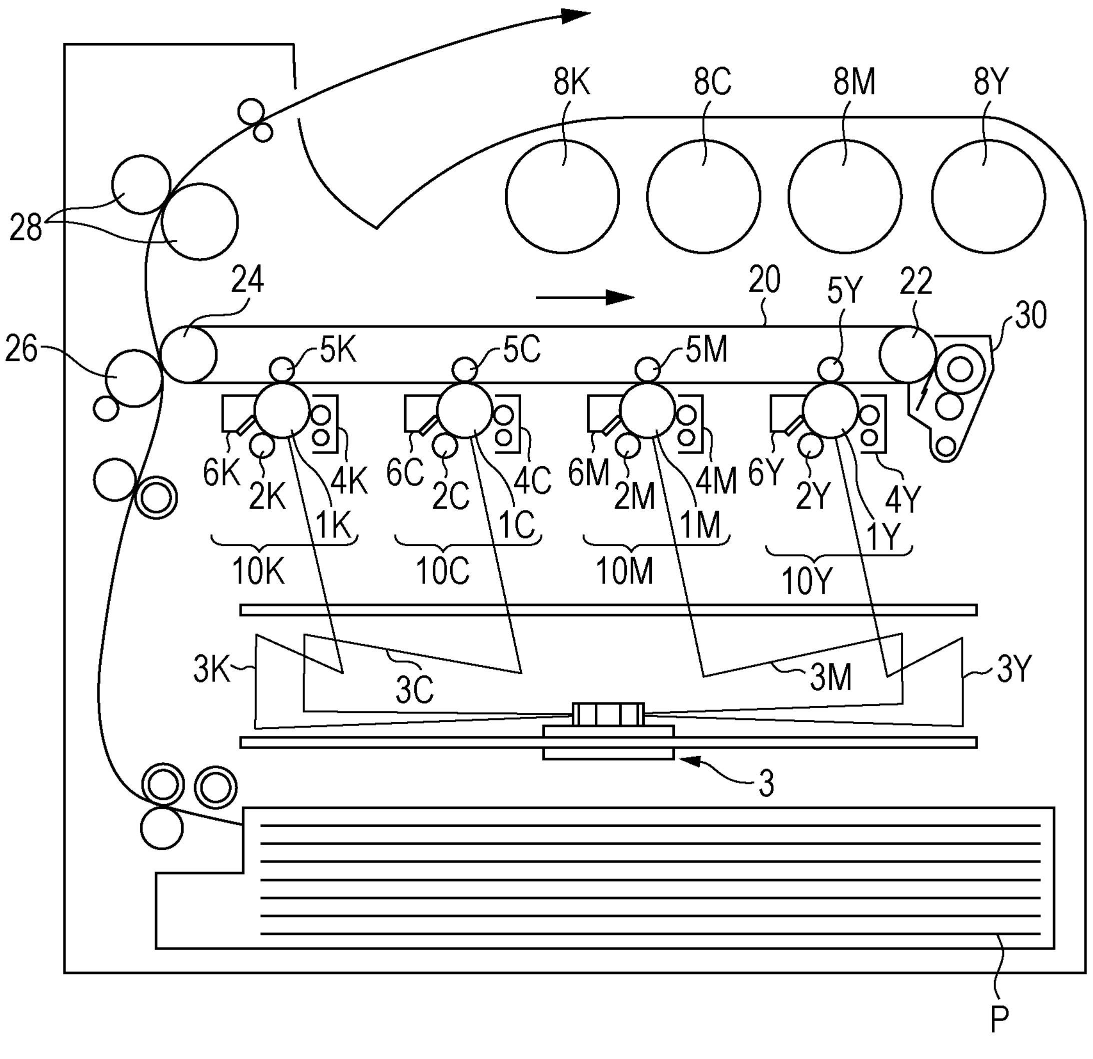
FIG. 1 is a schematic diagram illustrating an example of an image forming apparatus according to an exemplary embodiment.

Exemplary embodiments of the present disclosure are described below. The following description and Examples are intended to be illustrative of the exemplary embodiments of the present disclosure and not restrictive of the exemplary embodiments of the present disclosure.

In the present disclosure, a numerical range expressed using "to" means the range specified by the minimum and maximum described before and after "to", respectively.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

The term "step" used herein refers not only to an individual step but also to a step that is not distinguishable from other steps but achieves the intended purpose of the step.

In the present disclosure, when an exemplary embodiment is described with reference to a drawing, the structure of the exemplary embodiment is not limited to the structure illustrated in the drawing. The sizes of the members illustrated in the attached drawings are conceptual and do not limit the relative relationship among the sizes of the members.

Each of the components described in the present disclosure may include plural types of substances that correspond to the component. In the present disclosure, in the case where a composition includes plural substances that correspond to a component of the composition, the content of the component in the composition is the total content of the plural substances in the composition unless otherwise specified.

In the present disclosure, the number of types of particles that correspond to a component may be two or more. In the case where a composition includes plural types of particles that correspond to a component of the composition, the particle size of the component is the particle size of a mixture of the plural types of particles included in the composition unless otherwise specified.

In the present disclosure, an electrostatic image developing toner may be referred to simply as "toner", and an electrostatic image developer may be referred to simply as "developer".

The term "alkali metal" used herein refers to Li, Na, K, Rb, Cs, and Fr.

The term "alkaline-earth metal" used herein refers to Be, Mg, Ca, Sr, Ba, and Ra.

Electrostatic Image Developing Toner

First Exemplary Embodiment

A toner according to a first exemplary embodiment includes toner particles including a binder resin and a colorant. The net intensity $N_S$ of sulfur included in the toner particles and the total net intensity $N_A$ of alkali metals and alkaline-earth metals included in the toner particles, which are measured by XRF analysis, satisfy $1.0<N_S/N_A<22.0$.

If the dispersibility of a colorant in toner particles is poor, a secondary color image formed using the toner may have a narrow color gamut. In particular, in the case where fixing is performed at low pressures using, for example, an electromagnetic induction heating fixing device, it is difficult to melt toner particles to a sufficient degree and, consequently, the color gamut of the secondary color image is likely to become narrowed.

In contrast, the above-described toner according to the first exemplary embodiment may enable formation of a secondary color image having a wide color gamut. The reasons are presumably as described below.

Alkali metals and alkaline-earth metals included in toner particles cause aggregation of colorant particles. The alkali metals and alkaline-earth metals have a mild cohesive power and inhibit local aggregation of colorant particles. Sulfur included in toner particles reduces the aggregation of primary particles of a colorant and enables the colorant particles to be present in the toner particles in a consistent manner.

Adjusting the content of sulfur in toner particles to be high compared with the content of the alkali metals and alkaline-earth metals in the toner particles, which produce the above actions, that is, specifically, adjusting the net intensity $N_S$ of sulfur and the total net intensity $N_A$ of the alkali metals and alkaline-earth metals to satisfy $1.0<N_S/N_A<22.0$, may enhance the dispersibility of the colorant in the toner particles. This is because adjusting the content of sulfur, which has a relatively large ionic radius and a relatively small power to stabilize particles, to be higher than the content of the alkali metals and alkaline-earth metals, which have a relatively small ionic radius and a relatively high cohesive power, may offer a good balance.

When the dispersibility of the colorant in the toner particles is enhanced, the dispersibility of the colorant in the fixed image is enhanced accordingly. This may widen the color gamut of a secondary color image.

For the above reasons, the toner according to the first exemplary embodiment is considered capable of forming a secondary color image having a wide color gamut.

Second Exemplary Embodiment

A toner according to a second exemplary embodiment includes a toner particle including a binder resin and a colorant. The difference between the net intensity $N_S$ of sulfur included in the toner particle and the total net intensity $N_A$ of the alkali metals and alkaline-earth metals included in the toner particle which are measured by XRF analysis satisfies $0.8<N_S-N_A<5.0$.

The above-described toner according to the second exemplary embodiment may also enable formation of a secondary color image having a wide color gamut. This is presumably because, as in the first exemplary embodiment, adjusting the content of sulfur in toner particles to be high compared with the content of the alkali metals and alkaline-earth metals in the toner particles, that is, specifically, adjusting the difference between the net intensity $N_S$ of sulfur and the total net intensity $N_A$ of the alkali metals and alkaline-earth metals to satisfy $0.8<N_S-N_A<5.0$, may enhance the dispersibility of the colorant in the toner particles.

Details of a toner that corresponds to both toner according to the first exemplary embodiment and toner according to the second exemplary embodiment (hereinafter, such a toner is referred to as "toner according to the exemplary embodiment") are described below. Note that an example of the toner according to the exemplary embodiment of the present disclosure may be a toner that corresponds to either the toner according to the first exemplary embodiment or the toner according to the second exemplary embodiment.

The toner according to the exemplary embodiment includes toner particles. The toner may optionally include an external additive that is deposited on the surfaces of the toner particles.

Toner Particles

Net Intensities of Elements Included in Toner Particles Measured by XRF Analysis The net intensity $N_S$ of sulfur included in the toner particles and the total net intensity $N_A$ of alkali metals and alkaline-earth metals included in the toner particles satisfy $1.0<N_S/N_A<22.0$.

When the $N_S/N_A$ ratio is more than 1.0, the color gamut of a secondary color image may be enhanced. When the $N_S/N_A$ ratio is less than 22.0, a reduction in transfer efficiency may be limited.

In order to enhance the color gamut of a secondary color image, the net intensity $N_S$ of sulfur and the total net intensity $N_A$ of alkali metals and alkaline-earth metals preferably satisfy $1.0<N_S/N_A<20.0$ and more preferably satisfy $1.0<N_S/N_A<18.0$.

The above $N_S/N_A$ ratio may be 10.0 or more or may be 15.0 or more in order to enhance the color gamut of a secondary color image.

The difference between the net intensity $N_S$ of sulfur included in the toner particles and the total net intensity $N_A$ of alkali metals and alkaline-earth metals included in the toner particles which are measured by XRF analysis satisfies $0.8<N_S-N_A<5.0$.

When the difference $N_S-N_A$ is more than 0.8 kcps, the color gamut of a secondary color image may be enhanced. When the difference $N_S-N_A$ is less than 5.0 kcps, a reduction in transfer efficiency may be limited.

In order to enhance the color gamut of a secondary color image, the difference between the net intensity $N_S$ of sulfur and the total net intensity $N_A$ of alkali metals and alkaline-earth metals preferably satisfies $0.9<N_S-N_A<4.8$ and more preferably satisfies $1.0<N_S-N_A<4.5$.

The difference $N_S-N_A$ may be 2.0 or more or may be 3.0 or more in order to enhance the color gamut of a secondary color image.

The net intensity $N_S$ of sulfur included in the toner particles is preferably 2.5 kcps or more and 6.5 kcps or less, is more preferably 3.0 kcps or more and 6.0 kcps or less, and is further preferably 3.5 kcps or more and 5.5 kcps or less.

Adjusting the net intensity $N_S$ of sulfur to fall within the above range may enhance the dispersibility of the colorant and consequently enhance the color gamut of a secondary color image.

The total net intensity $N_A$ of alkali metals and alkaline-earth metals included in the toner particles is preferably 0.2 kcps or more and 4.2 kcps or less, is more preferably 1.0 kcps or more and 4.1 kcps or less, and is further preferably 2.0 kcps or more and 4.0 kcps or less.

Adjusting the net intensity $N_S$ of sulfur to fall within the above range may reduce local aggregation of the colorant and consequently enhance the color gamut of a secondary color image.

The net intensity $N_{c1}$ of chlorine included in the toner particles is preferably 0.05 kcps or more and 1.35 kcps or less, is more preferably 0.10 kcps or more and 1.30 kcps or less, and is further preferably 0.08 kcps or more and 1.25 kcps or less.

Adjusting the net intensity $N_{c1}$ of chlorine to fall within the above range may enhance the dispersibility of sulfur in the toner particles. As a result, the dispersibility of the colorant is also enhanced due to sulfur. Consequently, the color gamut of a secondary color image may be enhanced.

The net intensity $N_S$ of sulfur and the net intensity $N_{c1}$ of chlorine included in the toner particles preferably satisfy $2.5<N_S/N_{c1}<50$, more preferably satisfy $3<N_S/N_{c1}<40$, and further preferably satisfy $4<N_S/N_{c1}<35$.

Adjusting the ratio between the net intensity $N_S$ of sulfur and the net intensity $N_{c1}$ of chlorine to fall within the above range may enhance the dispersibility of sulfur in the toner particles. As a result, the dispersibility of the colorant is also enhanced due to sulfur. Consequently, the color gamut of a secondary color image may be enhanced.

In order to enhance the color gamut of a secondary color image, the alkali metals and alkaline-earth metals preferably include at least one element selected from the group consisting of Na, Mg, and Ca and more preferably include Mg.

In particular, the net intensity $N_S$ of sulfur and the net intensity $N_M$ of Mg preferably satisfy $14.0<N_S/N_M<25.0$, more preferably satisfy $15.0<N_S/N_M<22.0$, and further preferably satisfy $17.0<N_S/N_M<20.0$.

Examples of sources of the elements which are used for adjusting the net intensities of the elements included in the toner particles to fall within the respective ranges are as follows.

Examples of a sulfur source include additives, such as a surfactant, a flocculant, chain transfer agent, and an initiator, which include sulfur. Specific examples of the sulfur source include a metal salt of sulfuric acid, a metal salt of sulfonic acid, and a metal sulfide salt.

Examples of the metal salt of sulfuric acid include alkali metal salts of sulfuric acid, such as lithium sulfate, sodium sulfate, potassium sulfate, rubidium sulfate, cesium sulfate, and francium sulfate; alkaline-earth metal salts of sulfuric acid, such as beryllium sulfate, magnesium sulfate, calcium sulfate, strontium sulfate, barium sulfate, and radium sulfate; and aluminum sulfate and iron(II) polysulphate.

Examples of the metal salt of sulfonic acid include metal salts of alkylbenzenesulfonic acid, such as sodium dodecylbenzenesulfonate and calcium dodecylbenzenesulfonate.

Examples of the sulfide include calcium polysulfide.

Examples of the sulfur source also include alkanediols, such as dodecanethiol.

Examples of an alkali metal source include additives, such as a surfactant and a flocculant, which include an alkali metal. Specific examples of the additives including an alkali metal include an alkali metal salt.

Examples of the alkali metal salt include lithium salts, such as lithium chloride, lithium sulfate, and lithium nitrate; sodium salts, such as sodium chloride, sodium sulfate, and sodium nitrate; potassium salts, such as potassium chloride, potassium sulfate, and potassium nitrate; rubidium salts, such as rubidium chloride, rubidium sulfate, and rubidium nitrate; cesium salts, such as cesium chloride, cesium sulfate, and cesium nitrate; and francium salts, such as francium chloride, francium sulfate, and francium nitrate.

Examples of the alkali metal salt also include alkali metal salts of sulfonic acid (e.g., sodium alkylbenzene sulfonate, such as sodium dodecylbenzenesulfonate).

Examples of an alkaline-earth element source include additives, such as a surfactant and a flocculant, which include an alkaline-earth element. Specific examples of the additives including an alkaline-earth element include an alkaline-earth metal salt. Examples of the alkaline-earth metal salt include beryllium salts, such as beryllium chloride, beryllium sulfate, and beryllium nitrate; magnesium salts, such as magnesium chloride, magnesium sulfate, and magnesium nitrate; calcium salts, such as calcium chloride, calcium sulfate, and calcium nitrate; strontium salts, such as strontium chloride, strontium sulfate, and strontium nitrate; barium salts, such as barium chloride, barium sulfate, and barium nitrate; and radium salts, such as radium chloride, radium sulfate, and radium nitrate.

Examples of the alkaline-earth metal salt also include alkaline-earth metal salts of sulfonic acid (e.g., calcium alkylbenzenesulfonate, such as calcium dodecylbenzenesulfonate) and metal sulfide salts (e.g., calcium polysulfide).

Examples of a chlorine source include additives, such as a flocculant, which include chlorine. Specific examples of the additives including chlorine include chlorides. Examples of the chlorides include ammonium chloride, aluminum chloride, polyaluminum chloride, iron(II) chloride, zinc chloride, alkali metal chlorides, such as lithium chloride, sodium chloride, potassium chloride, rubidium chloride, cesium chloride, and francium chloride, and alkaline-earth metal chlorides, such as beryllium chloride, magnesium chloride, strontium chloride, barium chloride, and radium chloride.

The net intensities of the above elements are adjusted by changing the amounts of the sources of the elements used.

The net intensities of the above elements are measured by the following method.

About 200 mg of the toner particles (in the case where the toner particles include an external additive deposited on the surfaces thereof, the toner particles and the external additive deposited on the surfaces thereof) is compressed at a load of 10 t for 60 seconds with a compression molding machine to form a disc having a diameter of 10 mm and a thickness of 2 mm. Using the disc as an sample, an all-element analysis is conducted under the following conditions with a scanning X-ray fluorescence analyzer "ZSX Primus II" produced by Rigaku Corporation in order to determine the net intensities (unit: kilo counts per second, kcps) of the elements that are to be analyzed.

Tube voltage: 40 kV
Tube current: 70 mA
Anticathode: rhodium
Measurement time: 15 minutes
Analysis size: diameter of 10 mm Structure of Toner Particles The toner particles include, for example, a binder resin and, as needed, additives, such as a colorant and a release agent.

Binder Resin

Examples of the binder resin include vinyl resins that are homopolymers of the following monomers or copolymers of two or more monomers selected from the following monomers: styrenes, such as styrene, para-chlorostyrene, and α-methylstyrene; (meth)acrylates, such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the binder resin further include non-vinyl resins, such as epoxy resins, polyester resins, polyurethane resins, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The above binder resins may be used alone or in combination of two or more.

In particular, an amorphous resin and a crystalline resin are preferably used as a binder resin. An amorphous polyester resin and a crystalline polyester resin are more preferably used as a binder resin.

Using an amorphous resin (in particular, an amorphous polyester resin) in combination with a crystalline resin (in particular, a crystalline polyester resin) as a binder resin enhances the low-temperature fixability of the toner. However, a crystalline resin (in particular, a crystalline polyester resin) is present in toner particles in the form of domains, and it is difficult to disperse colorant particles in the domains of the crystalline resin. That is, regions of the toner particles in which colorant particles can be dispersed are limited. Therefore, when the toner particles include a crystalline resin (in particular, a crystalline polyester resin), the color gamut of a secondary color image is likely to be degraded.

When the net intensity $N_S$ of sulfur and the total net intensity $N_A$ of alkali metals and alkaline-earth metals are controlled, although regions of the toner particles in which colorant particles can be dispersed are limited, the degradation of the color gamut of a secondary color image which is caused as a result of the toner particles including a crystalline resin (in particular, a crystalline polyester resin) may be limited since the dispersibility of the colorant is enhanced.

The term "amorphous resin" used herein refers to a resin that does not exhibit a distinct endothermic peak but only a step-like endothermic change in thermal analysis conducted using differential scanning calorimetry (DSC), that is solid at normal temperature, and that undergoes heat plasticization at a temperature equal to or higher than the glass transition temperature.

The term "crystalline resin" used herein refers to a resin that exhibits a distinct endothermic peak instead of a step-like endothermic change in DSC.

Specifically, for example, an crystalline resin is a resin that exhibits an endothermic peak with a half-width of 10° C. or less at a heating rate of 10° C./min. An amorphous resin is a resin the half-width of which is more than 10° C. or a resin that does not exhibit a distinct endothermic peak.

The amorphous resin is described below.

Examples of the amorphous resin include the amorphous resins known in the related art, such as an amorphous polyester resin, an amorphous vinyl resin (e.g., a styrene acrylic resin), an epoxy resin, a polycarbonate resin, and a polyurethane resin. Among the above amorphous resins, an amorphous polyester resin and an amorphous vinyl resin (in particular, a styrene acrylic resin) are preferable, and an amorphous polyester resin is more preferable.

An amorphous polyester resin and a styrene acrylic resin may be used in combination with each other as an amorphous resin. An amorphous resin including an amorphous polyester resin segment and a styrene acrylic resin segment may be used as an amorphous resin.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed. In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where the monomers used in the copolymerization reaction have low miscibility with each other, a condensation reaction of the monomers with an acid or alcohol that is to undergo a polycondensation reaction with the monomers may be performed in advance and subsequently polycondensation of the resulting polymers with the other components may be performed.

The amorphous polyester resin may be a modified amorphous polyester resin as well as an unmodified amorphous polyester resin. The modified amorphous polyester resin is an amorphous polyester resin including a bond other than an ester bond or an amorphous polyester resin including a resin component other than a polyester, the resin component being bonded to the amorphous polyester resin with a covalent bond, an ionic bond, or the like. Examples of the modified amorphous polyester resin include a terminal-modified amorphous polyester resin produced by reacting an amorphous polyester resin having a functional group, such as an isocyanate group, introduced at the terminal with an active hydrogen compound.

The proportion of the amorphous polyester resin to the entire binder resin is preferably 60% by mass or more and 98% by mass or less, is more preferably 65% by mass or more and 95% by mass or less, and is further preferably 70% by mass or more and 90% by mass or less.

Styrene Acrylic Resin

The styrene acrylic resin is a copolymer produced by copolymerization of at least a monomer having a styrene skeleton (hereinafter, such a monomer is referred to as "styrene-based monomer") with a monomer having a (meth) acryl group or preferably a (meth)acryloxy group (hereinafter, such a monomer is referred to as "(meth)acryl-based monomer). Examples of the styrene acrylic resin include a copolymer of a styrene monomer with a (meth)acrylic acid ester monomer.

Note that an acrylic resin portion of the styrene acrylic resin is a partial structure produced by polymerization of either or both of an acrylic monomer and a methacrylic monomer. Note that the term "(meth)acryl" used herein refers to both "acryl" and "methacryl".

Examples of the styrene-based monomer include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The above styrene-based monomers may be used alone or in combination of two or more.

Examples of the (meth)acryl-based monomer include (meth)acrylic acid, methyl (meth)acrylate, ethyl (meth)acrylate, n-propyl (meth)acrylate, isopropyl (meth)acrylate, n-butyl (meth)acrylate, isobutyl (meth) acrylate, n-hexyl (meth) acrylate, 2-ethylhexyl (meth)acrylate, lauryl (meth) acrylate, stearyl (meth) acrylate, cyclohexyl (meth) acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The above (meth) acryl-based monomers may be used alone or in combination of two or more.

The polymerization ratio between the styrene-based monomer and the (meth)acryl-based monomer, that is, Styrene-based monomer:(Meth)acryl-based monomer, may be 70:30 to 95:5 by mass.

The styrene acrylic resin may include a crosslinked structure. The styrene acrylic resin including a crosslinked structure may be produced by, for example, copolymerization of the styrene-based monomer, the (meth)acryl-based monomer, and a crosslinkable monomer. The crosslinkable monomer may be, but not limited to, a difunctional or higher (meth)acrylate.

The method for preparing the styrene acrylic resin is not limited. For example, solution polymerization, precipitation polymerization, suspension polymerization, bulk polymerization, and emulsion polymerization may be used. The polymerization reaction may be conducted by any suitable process known in the related art, such as a batch process, a semi-continuous process, or a continuous process.

The proportion of the styrene acrylic resin to the entire binder resin is preferably 0% by mass or more and 20% by mass or less, is more preferably 1% by mass or more and 15% by mass or less, and is further preferably 2% by mass or more and 10% by mass or less.

Amorphous Resin Including Amorphous Polyester Resin Segment and Styrene Acrylic Resin Segment (hereinafter, such an amorphous resin is referred to as "hybrid amorphous resin")

A hybrid amorphous resin is an amorphous resin that includes an amorphous polyester resin segment and a styrene acrylic resin segment that are chemically bonded to each other.

Examples of the hybrid amorphous resin include a resin constituted by a backbone composed of a polyester resin and a side chain composed of a styrene acrylic resin chemically bonded to the backbone; a resin constituted by a backbone composed of a styrene acrylic resin and a side chain composed of a polyester resin chemically bonded to the backbone; a resin that includes a backbone composed of a polyester resin and a styrene acrylic resin chemically bonded to each other; and a resin constituted by a backbone composed of a polyester resin and a styrene acrylic resin chemically bonded to each other and at least one of a side chain composed of a polyester resin chemically bonded to the backbone and a side chain composed of a styrene acrylic resin chemically bonded to the backbone.

The amorphous polyester resin and styrene acrylic resin included in the above segments are as described above; descriptions thereof are omitted herein.

The ratio of the total amount of the polyester resin segment and the styrene acrylic resin segment to the total amount of the hybrid amorphous resin is preferably 80% by mass or more, is more preferably 90% by mass or more, is further preferably 95% by mass or more, and is most preferably 100% by mass.

In the hybrid amorphous resin, the proportion of the amount of the styrene acrylic resin segment to the total amount of the polyester resin segment and the styrene acrylic resin segment is preferably 20% by mass or more and 60% by mass or less, is more preferably 25% by mass or more and 55% by mass or less, and is further preferably 30% by mass or more and 50% by mass or less.

The hybrid amorphous resin may be produced by any of the methods (i) to (iii) below.

(i) condensation polymerization of a polyhydric alcohol with a polyvalent carboxylic acid is performed to prepare a polyester resin segment, and addition polymerization of a monomer constituting a styrene acrylic resin segment to the polyester resin segment is performed.

(ii) addition polymerization of an addition polymerizable monomer is performed to prepare a styrene acrylic resin segment and, subsequently, condensation polymerization of a polyhydric alcohol with a polyvalent carboxylic acid is performed.

(iii) condensation polymerization of a polyhydric alcohol with a polyvalent carboxylic acid and addition polymerization of an addition polymerizable monomer are performed simultaneously.

The proportion of the hybrid amorphous resin to the entire binder resin is preferably 60% by mass or more and 98% by mass or less, is more preferably 65% by mass or more and 95% by mass or less, and is further preferably 70% by mass or more and 90% by mass or less.

The properties of the amorphous resin are described below.

The glass transition temperature Tg of the amorphous resin is preferably 50° C. or more and 80° C. or less and is more preferably 50° C. or more and 65° C. or less.

The glass transition temperature of the amorphous resin is determined from a differential scanning calorimetry (DSC) curve obtained by DSC. More specifically, the glass transition temperature of the amorphous resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the amorphous resin is preferably 5,000 or more and 1,000,000 or less and is more preferably 7,000 or more and 500,000 or less.

The number average molecular weight Mn of the amorphous resin may be 2,000 or more and 100,000 or less.

The molecular weight distribution index Mw/Mn of the amorphous resin is preferably 1.5 or more and 100 or less and is more preferably 2 or more and 60 or less.

The weight average molecular weight and number average molecular weight of the amorphous resin are determined by gel permeation chromatography (GPC). Specifically, the molecular weights of the amorphous resin are determined by GPC using a "HLC-8120GPC" produced by Tosoh Corporation as measuring equipment, a column "TSKgel SuperHM-M (15 cm)" produced by Tosoh Corporation, and a tetrahydrofuran (THF) solvent. The weight average molecular weight and number average molecular weight of the amorphous resin are determined on the basis of the results of the measurement using a molecular-weight calibration curve based on monodisperse polystyrene standard samples.

The crystalline resin is described below.

Examples of the crystalline resin include the crystalline resins known in the related art, such as a crystalline polyester resin and a crystalline vinyl resin (e.g., a polyalkylene resin or a long-chain alkyl (meth)acrylate resin). Among these, a crystalline polyester resin may be used in consideration of the mechanical strength and low-temperature fixability of the toner.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from linear aliphatic polymerizable monomers may be used as a crystalline polyester resin instead of a condensation polymer prepared from polymerizable monomers having an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2,6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The crystalline polyester resin may be produced by any suitable method known in the related art similarly to, for example, the amorphous polyester resin.

The crystalline polyester resin may be a polymer of an α,ω-linear aliphatic dicarboxylic acid with an α,ω-linear aliphatic diol.

Since a polymer of an α,ω-linear aliphatic dicarboxylic acid with an α,ω-linear aliphatic diol is highly compatible with an amorphous polyester resin, the likelihood of dispersibility of the colorant being degraded when the toner is fixed may be reduced. Therefore, the dispersibility of the colorant in the fixed image may be enhanced and, consequently, the color gamut of a secondary color image may be enhanced.

The α,ω-linear aliphatic dicarboxylic acid may be an α,ω-linear aliphatic dicarboxylic acid that includes two carboxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic dicarboxylic acid include succinic acid, glutaric acid, adipic acid, 1,6-hexanedicarboxylic acid (common name: suberic acid), 1,7-heptanedicarboxylic acid (common name: azelaic acid), 1,8-octanedicarboxylic acid (common name: sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferable.

The above α,ω-linear aliphatic dicarboxylic acids may be used alone or in combination of two or more.

The α,ω-linear aliphatic diol may be an α,ω-linear aliphatic diol that includes two hydroxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The above α,ω-linear aliphatic diols may be used alone or in combination of two or more.

The polymer of the α,ω-linear aliphatic dicarboxylic acid with the α,ω-linear aliphatic diol is preferably a polymer of at least one dicarboxylic acid selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid with at least one diol selected from the group consisting of 1,6-hexanediol, 1,7-heptanediol, 1,8-octanediol, 1,9-nonanediol, and 1,10-decanediol, in order to enhance the color gamut of a secondary color image. In particular, a polymer of 1,10-decanedicarboxylic acid with 1,6-hexanediol is more preferable.

The proportion of the crystalline polyester resin to the entire binder resin is preferably 1% by mass or more and 20% by mass or less, is more preferably 2% by mass or more and 15% by mass or less, and is further preferably 3% by mass or more and 10% by mass or less.

The properties of the crystalline resin are described below.

The melting temperature of the crystalline resin is preferably 50° C. or more and 100° C. or less, is more preferably 55° C. or more and 90° C. or less, and is further preferably 60° C. or more and 85° C. or less.

The melting temperature of the crystalline resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline resin may have a weight average molecular weight Mw of 6,000 or more and 35,000 or less.

The content of the binder resin in the entire toner particles is preferably 40% by mass or more and 95% by mass or less, is more preferably 50% by mass or more and 90% by mass or less, and is further preferably 60% by mass or more and 85% by mass or less.

Colorant

Examples of the colorant include pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

Among the above colorants, a pigment may be used. When the dispersibility of the pigment is enhanced by controlling the net intensity $N_S$ of sulfur and the total net intensity $N_A$ of alkali metals and alkaline-earth metals, the color gamut of a secondary color image may be also enhanced.

The colorant may optionally be subjected to a surface treatment and may be used in combination with a dispersant. Plural types of colorants may be used in combination.

The content of the colorant in the entire toner particles is preferably 1% by mass or more and 30% by mass or less and is more preferably 3% by mass or more and 15% by mass or less.

Release Agent

A release agent is present in toner particles in the form of domains, and it is difficult to disperse colorant particles in the domains of the release agent. That is, regions of the toner particles in which colorant particles can be dispersed are limited. Therefore, when the toner particles include a release agent, the color gamut of a secondary color image is likely to be degraded.

When the net intensity $N_S$ of sulfur and the total net intensity $N_A$ of alkali metals and alkaline-earth metals are controlled, although regions of the toner particles in which colorant particles can be dispersed are limited, the degradation of the color gamut of a secondary color image which is caused as a result of the toner particles including a release agent may be limited since the dispersibility of the colorant is enhanced.

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The release agent is preferably an ester wax and is more preferably an ester wax that is an ester of a higher fatty acid having 10 to 30 carbon atoms with a monohydric or polyhydric alcohol having 1 to 30 carbon atoms.

Since the ester wax is highly compatible with an amorphous polyester resin, the likelihood of dispersibility of the colorant being degraded when the toner is fixed may be reduced. Therefore, the dispersibility of the colorant in the fixed image may be enhanced and, consequently, the color gamut of a secondary color image may be enhanced.

Examples of the ester wax include an ester of a higher fatty acid having 10 or more carbon atoms with a monohydric or polyhydric aliphatic alcohol having 8 or more carbon atoms which has a melting temperature of 60° C. or more and 110° C. or less, preferably has a melting temperature of 65° C. or more and 100° C. or less, and more preferably has a melting temperature of 70° C. or more and 95° C. or less.

Examples of the ester wax include an ester of a higher fatty acid, such as caprylic acid, capric acid, lauric acid, myristic acid, palmitic acid, stearic acid, arachidic acid, behenic acid, or oleic acid, with an alcohol (e.g., a monohydric alcohol, such as methanol, ethanol, propanol, isopropanol, butanol, capryl alcohol, lauryl alcohol, myristyl alcohol, cetyl alcohol, stearyl alcohol, or oleyl alcohol; or a polyhydric alcohol, such as glycerin, ethylene glycol, propylene glycol, sorbitol, or pentaerythritol). Specific examples thereof include a carnauba wax, a rice bran wax, a candelilla wax, a jojoba oil, a Japan wax, a beeswax, a Chinese wax, lanoline, and a montanic ester wax.

The melting temperature of the release agent is preferably 50° C. or more and 110° C. or less and is more preferably 60° C. or more and 100° C. or less.

The melting temperature of the release agent is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The content of the release agent in the entire toner particles is preferably 1% by mass or more and 20% by mass or less and is more preferably 5% by mass or more and 15% by mass or less.

Other Additives

Examples of the other additives include additives known in the related art, such as a magnetic substance, a charge-controlling agent, and an inorganic powder. These additives may be added to the toner particles as internal additives.

Properties of Toner Particles

When the toner particles include at least one of the crystalline resin (in particular, crystalline polyester resin) and the release agent in order to enhance low-temperature fixability and releasability, the crystalline resin (in particular, crystalline polyester resin) and the release agent are present in the toner particles in the form of domains. It is difficult to disperse colorant particles in the domains of the crystalline resin and the release agent. That is, regions of the toner particles in which colorant particles can be dispersed are limited. Therefore, when the toner particles include at least one of the crystalline resin (in particular, crystalline polyester resin) and the release agent, the color gamut of a secondary color image is likely to be degraded.

When the net intensity $N_S$ of sulfur and the total net intensity $N_A$ of alkali metals and alkaline-earth metals are controlled, although regions of the toner particles in which colorant particles can be dispersed are limited, the degradation of the color gamut of a secondary color image which is caused as a result of the toner particles including at least one of the crystalline resin (in particular, crystalline polyester resin) and the release agent may be limited since the dispersibility of the colorant is enhanced.

Specifically, even in the case where, when a cross section of each toner particle is observed, the area fraction of regions in which the colorant is dispersed to the cross section of the toner particle is reduced to, for example, 55% or more and 97% or less, 60% or more and 95% or less, or 60% or more and 80% or less, the degradation of the color gamut of a secondary color image may be limited, that is, the color gamut of a secondary color image may be enhanced.

Note that the regions in which the colorant is dispersed are regions of the cross section of the toner particle which are other than the domains of the crystalline resin and the release agent. The area fraction of the regions in which the colorant is dispersed is measured by the following method.

A toner particle (or a toner particle including an external additive adhered thereon) is mixed with an epoxy resin so as to be buried in the epoxy resin. The epoxy resin is then solidified. The resulting solid is cut with an ultramicrotome apparatus "Ultracut UCT" produced by Leica Biosystems into a thin specimen having a thickness of 80 nm or more and 130 nm or less. The thin specimen is stained with ruthenium tetroxide in a desiccator at 30° C. for 3 hours. A transmission image-mode STEM observation image (acceleration voltage: 30 kV, magnification: 20,000 times) of the stained thin specimen is captured with an ultra-high-resolution field-emission scanning electron microscope (FE-SEM) "S-4800" produced by Hitachi High-Tech Corporation.

In the toner particle, a crystalline polyester resin and a release agent are distinguished from one another on the basis of contrast and shape. In the SEM image, since the binder resin other than the release agent includes a number of double bond portions and stained with ruthenium tetroxide, a release agent portion and a resin portion other than the release agent can be distinguished from each other.

Specifically, by ruthenium staining, a release agent domain is stained most slightly, a crystalline resin (e.g., a crystalline polyester resin) is stained second most slightly, and an amorphous resin (e.g., an amorphous polyester resin) is stained most intensely. When contrast is adjusted appropriately, a release agent appears as a white domain, an amorphous resin appears as a black domain, and a crystalline resin appears as a light gray domain.

The area of the regions of the crystalline resin and the release agent is determined by image analysis. The area of the regions in which the colorant is dispersed is determined by subtracting the area of the regions of the crystalline resin and the release agent from the area of the cross section of the toner particle. The area fraction of the regions in which the colorant is dispersed is calculated using the following formula.

[Area fraction of regions in which colorant is dispersed (%)]=[Area of regions in which colorant is dispersed]/[Area of cross section of toner particle]×100

Note that the "area fraction of the regions in which the colorant is dispersed" is the average over 50 toner particles.

The toner particles may have a single-layer structure or a "core-shell" structure constituted by a core (i.e., core particle) and a coating layer (i.e., shell layer) covering the core.

The core-shell structure of the toner particles may be constituted by, for example, a core including a binder resin and, as needed, other additives such as a colorant and a release agent and by a coating layer including the binder resin.

The volume average diameter D50v of the toner particles is preferably 2 μm or more and 10 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5 mass %-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.]

The toner particles preferably has an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO \cdot SiO_2$ particles, $K_2O \cdot (TiO_2)_n$ particles, $Al_2O_3 \cdot 2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more.

The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate, or a melamine resin; and particles of a cleaning lubricant, such as a metal salt of a higher fatty acid, such as zinc stearate, or a fluorine-contained resin.

The amount of the external additive used is preferably 0.01% by mass or more and 5% by mass or less and is more preferably 0.01% by mass or more and 2.0% by mass or less of the amount of the toner particles.

Method for Producing Toner

The toner according to the exemplary embodiment is produced by, after the preparation of the toner particles, depositing an external additive on the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used. Among these methods, aggregation coalescence may be used in order to prepare the toner particles.

Specifically, in the case where, for example, aggregation coalescence is used in order to prepare the toner particles, the toner particles are prepared by the following steps:

preparing a resin particle dispersion liquid in which particles of a resin that serves as a binder resin are dispersed (hereinafter, this step is referred to as "resin particle dispersion liquid preparation step");

causing the resin particles and, as needed, other particles to aggregate together in the resin particle dispersion liquid or a mixture of the resin particle dispersion liquid and another particle dispersion liquid in order to form aggregated particles (hereinafter, this step is referred to as "aggregated particle formation step"); and heating the resulting aggregated particle dispersion liquid in which the aggregated particles are dispersed in order to cause fusion and coalescence of the aggregated particles and form toner particles (hereinafter, this step is referred to as "fusion and coalescence step").

In order to adjust the net intensities of the elements included in the toner particles to fall within the above range, the sources of the elements are used in the production of toner particles.

Each of the above steps is described below in detail.

Hereinafter, a method for preparing toner particles including a colorant and a release agent is described. However, it should be noted that the colorant and the release agent are optional. It is needless to say that additives other than a colorant or a release agent may be used.

Resin Particle Dispersion Liquid Preparation Step

First, a resin particle dispersion liquid in which particles of a resin that serves as a binder resin are dispersed is prepared. Furthermore, for example, a colorant particle dispersion liquid in which particles of a colorant are dispersed and a release agent particle dispersion liquid in which particles of a release agent are dispersed are prepared.

The resin particle dispersion liquid is prepared by, for example, dispersing resin particles in a dispersion medium using a surfactant.

Examples of the dispersion medium used for preparing the resin particle dispersion liquid include aqueous media.

Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants.

These surfactants may be used alone or in combination of two or more.

In the preparation of the resin particle dispersion liquid, the resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the resin particles used, the resin particles may be dispersed in the resin particle dispersion liquid by, for example, phase-inversion emulsification.

Phase-inversion emulsification is a method in which the resin to be dispersed is dissolved in a hydrophobic organic solvent in which the resin is soluble, a base is added to the resulting organic continuous phase (i.e., 0 phase) to perform neutralization, and subsequently an aqueous medium (i.e., W phase) is charged in order to perform conversion of resin (i.e., phase inversion) from W/O to O/W, form a discontinuous phase, and disperse the resin in the aqueous medium in the form of particles.

The volume average diameter of the resin particles dispersed in the resin particle dispersion liquid is preferably, for example, 0.01 μm or more and 1 μm or less, is more preferably 0.08 μm or more and 0.8 μm or less, and is further preferably 0.1 μm or more and 0.6 μm or less.

The volume average diameter of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average diameters of particles included in the other dispersion liquids are also determined in the above-described manner.

The content of the resin particles included in the resin particle dispersion liquid is, for example, preferably 5% by mass or more and 50% by mass or less and is more preferably 10% by mass or more and 40% by mass or less.

The colorant particle dispersion liquid, the release agent particle dispersion liquid, and the like are also prepared as in the preparation of the resin particle dispersion liquid. In other words, the above-described specifications for the volume average diameter of the particles included in the resin particle dispersion liquid, the dispersion medium of the resin particle dispersion liquid, the dispersion method used for preparing the resin particle dispersion liquid, and the content of the particles in the resin particle dispersion liquid can also be applied to colorant particles dispersed in the colorant particle dispersion liquid and release agent particles dispersed in the release agent particle dispersion liquid.

Aggregated Particle Formation Step

The resin particle dispersion liquid is mixed with the colorant particle dispersion liquid and the release agent particle dispersion liquid.

In the resulting mixed dispersion liquid, heteroaggregation of the resin particles with the colorant particles and the release agent particles is performed in order to form aggregated particles including the resin particles, the colorant particles, and the release agent particles, the aggregated particles having a diameter close to that of the intended toner particles.

Specifically, for example, a flocculant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to the glass transition temperature of the resin particles (specifically, e.g., [Glass transition temperature of the resin particles −30° C.] or more and [the Glass transition temperature −10° C.] or less), and thereby the particles dispersed in the mixed dispersion liquid are caused to aggregate together to form aggregated particles.

In the aggregated particle formation step, alternatively, for example, the above flocculant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the flocculant include surfactants, inorganic metal salts, and divalent or higher metal complexes that have a polarity opposite to that of the surfactant included in the mixed dispersion liquid as a dispersant. In particular, using a metal complex as a flocculant reduces the amount of surfactant used and, as a result, charging characteristics may be enhanced.

An additive capable of forming a complex or a bond similar to a complex with the metal ions contained in the flocculant may optionally be used. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and iminodiacetic acid (IDA), nitrilotriacetic acid (NTA), and ethylenediaminetetraacetic acid (EDTA).

The amount of the chelating agent used is, for example, preferably 0.01 parts by mass or more and 5.0 parts by mass or less and is more preferably 0.1 parts by mass or more and less than 3.0 parts by mass relative to 100 parts by mass of the resin particles.

Fusion and Coalescence Step

An aggregated particle dispersion liquid in which the aggregated particles are dispersed is heated to, for example, a temperature equal to or higher than the glass transition temperature of the resin particles (e.g., [Glass transition temperature of the resin particles+10° C.] or more and [the Glass transition temperature+30° C.] or less) in order to perform fusion and coalescence of the aggregated particles. Hereby, toner particles are formed.

Toner particles are produced by the above-described steps.

Alternatively, toner particles may be produced by the following steps:

after the aggregated particle dispersion liquid in which the aggregated particles are dispersed has been prepared, further mixing the aggregated particle dispersion liquid with a resin particle dispersion liquid in which resin particles are dispersed in order to cause aggregation such that the resin particles are further deposited on the surfaces of the aggregated particles and thereby form second aggregated particles; and heating a second aggregated particle dispersion liquid in which the second aggregated particles are dispersed in order to perform fusion and coalescence of the second aggregated particles and form toner particles having a core-shell structure.

After the completion of the fusion-coalescence step, the toner particles formed in the solution are subjected to any suitable cleaning step, solid-liquid separation step, and drying step that are known in the related art in order to obtain dried toner particles.

In the cleaning step, the toner particles may be subjected to displacement washing using ion-exchange water to a sufficient degree from the viewpoint of electrification characteristics. Examples of a solid-liquid separation method used in the solid-liquid separation step include, but are not limited to, suction filtration and pressure filtration from the viewpoint of productivity. Examples of a drying method used in the drying step include, but are not limited to, freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Electrostatic Image Developer

An electrostatic image developer according to the exemplary embodiment includes at least the toner according to the exemplary embodiment.

The electrostatic image developer according to the exemplary embodiment may be a single component developer including only the toner according to the exemplary embodiment or may be a two-component developer that is a mixture of the toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin.

The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin.

The coat resin and the matrix resin may optionally include additives, such as conductive particles.

Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a resin by, for example, using a coating-layer forming solution prepared by dissolving the coat resin and, as needed, various types of additives in a suitable solvent. The type of the solvent is not limited and may be selected with consideration of the type of the resin used, ease of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner: carrier=1:100 to 30:100 and is more preferably 3:100 to 20:100.

Image Forming Apparatus and Image Forming Method

An image forming apparatus and an image forming method according to the exemplary embodiment are described below.

The image forming apparatus according to the exemplary embodiment includes an image holding member; a charging unit that charges the surface of the image holding member; an electrostatic image formation unit that forms an electrostatic image on the charged surface of the image holding member; a developing unit that includes an electrostatic image developer and develops the electrostatic image formed on the surface of the image holding member with the electrostatic image developer to form a toner image; a transfer unit that transfers the toner image formed on the surface of the image holding member onto the surface of a recording medium; and a fixing unit that fixes the toner image onto the surface of the recording medium. The electrostatic image developer is the electrostatic image developer according to the exemplary embodiment.

The image forming apparatus according to the exemplary embodiment uses an image forming method (image forming method according to the exemplary embodiment) including charging the surface of the image holding member; forming an electrostatic image on the charged surface of the image holding member; developing the electrostatic image formed on the surface of the image holding member with the electrostatic image developer according to the exemplary embodiment to form a toner image; transferring the toner image formed on the surface of the image holding member onto the surface of a recording medium; and fixing the toner image onto the surface of the recording medium.

The image forming apparatus according to the exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning unit that cleans the surface of the image holding member subsequent to the transfer of the toner image before the image holding member is again charged; and an image forming apparatus including a static-erasing unit that erases static by irradiating the surface of an image holding member with static-erasing light subsequent to the transfer of the toner image before the image holding member is again charged.

In the case where the image forming apparatus is the intermediate-transfer image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to the exemplary embodiment, for example, a portion including the developing unit may have a cartridge structure (i.e., process cartridge) detachably attachable to the image forming apparatus. An example of the process cartridge is a process cartridge including the electrostatic image developer according to the exemplary embodiment and the developing unit.

An example of the image forming apparatus according to the exemplary embodiment is described below, but the image forming apparatus is not limited thereto. Hereinafter, only components illustrated in drawings are described; others are omitted.

FIG. 1 schematically illustrates the image forming apparatus according to the exemplary embodiment.

The image forming apparatus illustrated in FIG. 1 includes first to fourth electrophotographic image formation units 10Y, 10M, 10C, and 10K that form yellow (Y), magenta (M), cyan (C), and black (K) images, respectively, on the basis of color separation image data. The image formation units (hereinafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt 20 that serves as an intermediate transfer body runs above (in FIG. 1) and extends over the units 10Y, 10M, 10C, and 10K. The intermediate transfer belt 20 is wound around a drive roller 22 and a support roller 24 arranged to contact with the inner surface of the intermediate transfer belt 20, which are spaced from each other in a direction from left to right in FIG. 1, and runs clockwise in FIG. 1, that is, in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer body-cleaning device 30 is disposed so as to contact with the image-carrier-side surface of the intermediate transfer belt 20 and to face the drive roller 22.

Developing devices (i.e., developing units) 4Y, 4M, 4C, and 4K of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs. Note that components of the second to fourth units 10M, 10C, and 10K which are equivalent to the above-described components of the first unit 10Y are denoted with reference numerals including magenta (M), cyan (C), or black (K) instead of yellow (Y), and the descriptions of the second to fourth units 10M, 10C, and 10K are omitted.

The first unit 10Y includes a photosensitive member 1Y serving as an image holding member. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer subunit) 5Y that transfers the developed toner image to the intermediate transfer belt 20; and a photosensitive-member cleaning device (example of the cleaning unit) 6Y that removes a toner remaining on the surface of the photosensitive member 1Y after the first transfer.

The first transfer roller 5Y is disposed so as to contact with the inner surface of the intermediate transfer belt 20 and to face the photosensitive member 1Y. Each of the first transfer rollers 5Y, 5M, 5C, and 5K is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive substrate (e.g., volume resistivity at 20° C.: $1\times10^{-6}$ Ωcm or less). The photosensitive layer is normally of high resistance (comparable with the resistance of ordinary resins), but, upon being irradiated with the laser beam 3Y, the specific resistance of the portion irradiated with the laser beam varies. Thus, the exposure device 3 irradiates the surface of the charged photosensitive member 1Y with the laser beam 3Y on the basis of the image data of the yellow image sent from the controller (not illustrated). The laser beam 3Y is impinged on the photosensitive layer formed in the surface of the photosensitive member 1Y. As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is visualized (i.e., developed) in the form of a toner image by the developing device 4Y at the developing position.

The developing device 4Y includes an electrostatic image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the erased latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, for example, in the first unit 10Y, +10 μA by a controller (not illustrated).

The toner particles remaining on the photosensitive member 1Y are removed by the photosensitive-member cleaning device 6Y and then collected.

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The resulting intermediate transfer belt 20 on which toner images of four colors are multiple-transferred in the first to fourth units is then transported to a second transfer section including a support roller 24 contacting with the inner surface of the intermediate transfer belt 20 and a second transfer roller (example of the second transfer subunit) 26 disposed on the image-carrier-side of the intermediate transfer belt 20. A recording paper (example of the recording medium) P is fed by a feed mechanism into a narrow space between the second transfer roller 26 and the intermediate transfer belt 20 that contact with each other at the predetermined timing. The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

Subsequently, the recording paper P is transported into a nip part of the fixing device (example of the fixing unit) 28 at which a pair of fixing rollers contact with each other. The toner image is fixed to the recording paper P to form a fixed image.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

The recording paper P, to which the color image has been fixed, is transported toward an exit portion. Thus, the series of the steps for forming a color image are terminated.

Process Cartridge and Toner Cartridge

A process cartridge according to the exemplary embodiment is described below.

The process cartridge according to the exemplary embodiment includes a developing unit that includes the electrostatic image developer according to the exemplary embodiment and develops an electrostatic image formed on the surface of an image holding member with the electrostatic image developer to form a toner image. The process cartridge according to the exemplary embodiment is detachably attachable to an image forming apparatus.

The structure of the process cartridge according to the exemplary embodiment is not limited to the above-described one. The process cartridge according to the exemplary embodiment may further include, in addition to the developing device, at least one unit selected from an image holding member, a charging unit, an electrostatic image formation unit, a transfer unit, etc.

An example of the process cartridge according to the exemplary embodiment is described below, but the process cartridge is not limited thereto. Hereinafter, only components illustrated in FIG. 2 are described; others are omitted.

Figure 2:
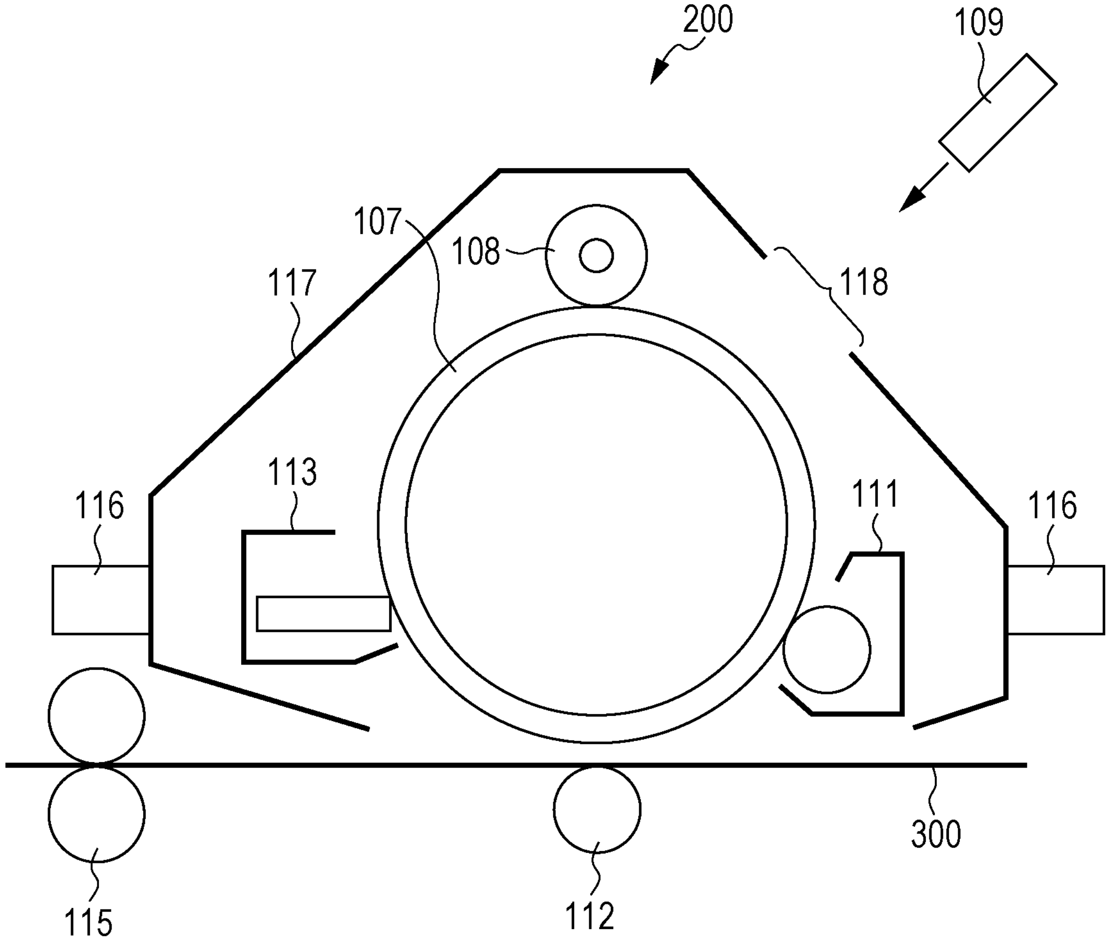
FIG. 2 is a schematic diagram illustrating an example of a process cartridge according to the exemplary embodiment which is detachably attachable to an image forming apparatus.

FIG. 2 schematically illustrates the process cartridge according to the exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic image formation unit), Reference numeral 112 denotes a transfer device (example of the transfer unit), Reference numeral 115 denotes a fixing device (example of the fixing unit), and the Reference numeral 300 denotes recording paper (example of the recording medium).

A toner cartridge according to the exemplary embodiment is described below.

The toner cartridge according to the exemplary embodiment is a toner cartridge that includes the toner according to the exemplary embodiment and is detachably attachable to an image forming apparatus. The toner cartridge includes a replenishment toner that is to be supplied to the developing unit disposed inside an image forming apparatus.

The image forming apparatus illustrated in FIG. 1 is an image forming apparatus that includes the toner cartridges 8Y, 8M, 8C, and 8K detachably attached to the image forming apparatus. Each of the developing devices 4Y, 4M, 4C, and 4K is connected to a specific one of the toner cartridges which corresponds to the color of the developing device with a toner supply pipe (not illustrated). When the amount of toner contained in a toner cartridge is small, the toner cartridge is replaced.

EXAMPLES

Details of the exemplary embodiments of the present disclosure are described with reference to Examples below. The exemplary embodiments of the present disclosure are not limited to Examples below. Hereinafter, the terms "part" and "%" are on a mass basis unless otherwise specified.

Synthesis of Amorphous Polyester Resin (A)

Terephthalic acid: 68 parts
Fumaric acid: 32 parts
Ethylene glycol: 42 parts
1,5-Pentanediol: 47 parts The above materials are charged into a flask equipped with a stirring apparatus, a nitrogen introduction tube, a temperature sensor, and a fractionating column. Subsequently, the temperature is increased to 220° C. over 1 hour under a stream of nitrogen gas. Then, 1 part of titanium tetraethoxide is added to the flask relative to 100 parts of the total amount of the above materials. While the product water is removed by distillation, the temperature is then increased to 240° C. over 0.5 hours and a dehydration condensation reaction is continued for 1 hour at 240° C. Subsequently, the product of the reaction is cooled. Hereby, an amorphous polyester resin (A) having a weight average molecular weight of 97,000 and a glass transition temperature of 60° C. is prepared.

Preparation of Amorphous Polyester Resin Particle Dispersion Liquid (A1)

Into a container equipped with a temperature control device and a nitrogen purging device, 40 parts of ethyl acetate and 25 parts of 2-butanol are charged. After the resulting mixture has been formed into a mixed solvent, 100 parts of the amorphous polyester resin is gradually charged into the container to form a solution. To the solution, a 10% aqueous ammonia solution is added in an amount equivalent to an amount three times the acid value of the resin in terms of molar ratio. The resulting liquid mixture is stirred for 30 minutes. Subsequently, the inside of the container is purged with a dry nitrogen gas. While the temperature is maintained to be 40° C. and the liquid mixture is stirred, 400 parts of ion-exchange water is added dropwise to the container to perform emulsification. After the addition of the ion-exchange water has been terminated, the resulting emulsion liquid is cooled to 25° C. Hereby, a resin particle dispersion liquid containing resin particles having a volume average size of 195 nm is prepared. The solid content in the resin particle dispersion liquid is adjusted to be 20% by the addition of ion-exchange water. Hereby, an amorphous polyester resin particle dispersion liquid (A1) is prepared.

Preparation of Cyan Colorant-Containing Amorphous Polyester Resin Particle Dispersion Liquid (C1)

Into a Henschel mixer, 250 parts of the amorphous polyester resin (A) and 50 parts of C.I. Pigment Blue 15:3 (phthalocyanine pigment "Cyanine Blue 4937" produced by Dainichiseika Color & Chemicals Mfg. Co., Ltd.) are charged. The resulting mixture is stirred with a screw rotating at 600 rpm for 120 seconds to form a raw material (A). Into a raw material input port of a twin screw extruder "TEM-58SS" produced by Toshiba Machine Co., Ltd., 200 parts of the raw material (A) and 0.2 parts of a 50% aqueous sodium hydroxide solution are charged. From the fourth barrel of the twin screw extruder, 40 parts of an anionic surfactant "TaycaPower" produced by TAYCA CORPORATION (solid content: 12%, sodium dodecylbenzenesulfonate) is charged. The resulting mixture is kneaded with barrels kept at 95° C. and a screw rotating at 240 rpm. Subsequently, 150 parts, 150 parts, and 15 parts of ion-exchange water having a temperature of 95° C. are charged from the fifth, seventh, and ninth barrels of the twin screw extruder, respectively. Kneading is performed such that the average feed rate of the raw material (A) is 200 kg/h. Hereby, a resin particle dispersion liquid containing resin particles having a volume average size of 180 nm is prepared. The solid content in the resin particle dispersion liquid is adjusted to be 20% by the addition of ion-exchange water. Hereby, a cyan colorant (C.I. Pigment Blue 15:3)-containing amorphous polyester resin particle dispersion liquid (C1) is prepared.

Preparation of Magenta Colorant-Containing Amorphous Polyester Resin Particle Dispersion Liquid (M1)

A magenta colorant (C.I. Pigment Red 269)-containing amorphous polyester resin particle dispersion liquid (M1) is prepared as in the preparation of the cyan colorant (C.I. Pigment Blue 15:3)-containing amorphous polyester resin particle dispersion liquid (C1), except that the colorant is changed from C.I. Pigment Blue 15:3 to C.I. Pigment Red 269 (quinacridone pigment "SYMULER FAST RED1022" produced by Dainippon Ink and Chemicals).

Preparation of Yellow Colorant-Containing Amorphous Polyester Resin Particle Dispersion Liquid (Y1)

A yellow colorant (C.I. Pigment Yellow 74)-containing amorphous polyester resin particle dispersion liquid (Y1) is prepared as in the preparation of the cyan colorant (C.I. Pigment Blue 15:3)-containing amorphous polyester resin particle dispersion liquid (C1), except that the colorant is changed from C.I. Pigment Blue 15:3 to C.I. Pigment Yellow 74 (monoazo pigment "Seikafast Yellow 2054" produced by Dainichiseika Color & Chemicals Mfg. Co., Ltd.).

Preparation of Black Colorant-Containing Amorphous Polyester Resin Particle Dispersion Liquid (K1)

A black colorant (carbon black)-containing amorphous polyester resin particle dispersion liquid (K1) is prepared as in the preparation of the cyan colorant (C.I. Pigment Blue 15:3)-containing amorphous polyester resin particle dispersion liquid (C1), except that the colorant is changed from C.I. Pigment Blue 15:3 to carbon black "Regal 330" produced by Cabot Corporation.

Preparation of Amorphous Polyester Resin Particle Dispersion Liquids Containing Various Colorants (C2/M2/Y2/K2)

The following amorphous polyester resin particle dispersion liquids containing various colorants are prepared as in the preparation of the cyan colorant (C.I. Pigment Blue 15:3)-containing amorphous polyester resin particle dispersion liquid (C1), except that the amount of the anionic surfactant "TaycaPower" produced by TAYCA CORPORATION (solid content: 12%, sodium dodecylbenzenesulfonate) charged from the fourth barrel of the twin screw extruder is changed from 40 parts to 20 parts.

Cyan colorant (C.I. Pigment Blue 15:3)-containing amorphous polyester resin particle dispersion liquid (C2)

Magenta colorant (C.I. Pigment Red 269)-containing amorphous polyester resin particle dispersion liquid (M2)

Yellow colorant (C.I. Pigment Yellow 74)-containing amorphous polyester resin particle dispersion liquid (Y2)

Black colorant (carbon black)-containing amorphous polyester resin particle dispersion liquid (K2)

Preparation of Amorphous Polyester Resin Particle Dispersion Liquids Containing Various Colorants (C3/M3/Y3/K3)

The following amorphous polyester resin particle dispersion liquids containing various colorants are prepared as in the preparation of the cyan colorant (C.I. Pigment Blue 15:3)-containing amorphous polyester resin particle dispersion liquid (C1), except that the amount of the anionic surfactant "TaycaPower" produced by TAYCA CORPORATION (solid content: 12%, sodium dodecylbenzenesulfonate) charged from the fourth barrel of the twin screw extruder is changed from 40 parts to 60 parts.

Cyan colorant (C.I. Pigment Blue 15:3)-containing amorphous polyester resin particle dispersion liquid (C3)

Magenta colorant (C.I. Pigment Red 269)-containing amorphous polyester resin particle dispersion liquid (M3)

Yellow colorant (C.I. Pigment Yellow 74)-containing amorphous polyester resin particle dispersion liquid (Y3)

Black colorant (carbon black)-containing amorphous polyester resin particle dispersion liquid (K3)

Preparation of Amorphous Polyester Resin Particle Dispersion Liquids Containing Various Colorants (C4/M4/Y4/K4)

The following amorphous polyester resin particle dispersion liquids containing various colorants are prepared as in the preparation of the cyan colorant (C.I. Pigment Blue 15:3)-containing amorphous polyester resin particle dispersion liquid (C1), except that the amount of the anionic surfactant "TaycaPower" produced by TAYCA CORPORATION (solid content: 12%, sodium dodecylbenzenesulfonate) charged from the fourth barrel of the twin screw extruder is changed from 40 parts to 5 parts.

Cyan colorant (C.I. Pigment Blue 15:3)-containing amorphous polyester resin particle dispersion liquid (C4)

Magenta colorant (C.I. Pigment Red 269)-containing amorphous polyester resin particle dispersion liquid (M4)

Yellow colorant (C.I. Pigment Yellow 74)-containing amorphous polyester resin particle dispersion liquid (Y4)

Black colorant (carbon black)-containing amorphous polyester resin particle dispersion liquid (K4)

Preparation of Amorphous Polyester Resin Particle Dispersion Liquids Containing Various Colorants (C5/M5/Y5/K5)

The following amorphous polyester resin particle dispersion liquids containing various colorants are prepared as in the preparation of the cyan colorant (C.I. Pigment Blue 15:3)-containing amorphous polyester resin particle dispersion liquid (C1), except that the amount of the anionic surfactant "TaycaPower" produced by TAYCA CORPORATION (solid content: 12%, sodium dodecylbenzenesulfonate) charged from the fourth barrel of the twin screw extruder is changed from 40 parts to 75 parts.

Cyan colorant (C.I. Pigment Blue 15:3)-containing amorphous polyester resin particle dispersion liquid (C5)

Magenta colorant (C.I. Pigment Red 269)-containing amorphous polyester resin particle dispersion liquid (M5)

Yellow colorant (C.I. Pigment Yellow 74)-containing amorphous polyester resin particle dispersion liquid (Y5)

Black colorant (carbon black)-containing amorphous polyester resin particle dispersion liquid (K5)

Preparation of Amorphous Polyester Resin Particle Dispersion Liquids Containing Various Colorants (C6/M6/Y6/K6)

The following amorphous polyester resin particle dispersion liquids containing various colorants are prepared as in the preparation of the cyan colorant (C.I. Pigment Blue 15:3)-containing amorphous polyester resin particle dispersion liquid (C1), except that the amount of the anionic surfactant "TaycaPower" produced by TAYCA CORPORATION (solid content: 12%, sodium dodecylbenzenesulfonate) charged from the fourth barrel of the twin screw extruder is changed from 40 parts to 25 parts.

Cyan colorant (C.I. Pigment Blue 15:3)-containing amorphous polyester resin particle dispersion liquid (C6)

Magenta colorant (C.I. Pigment Red 269)-containing amorphous polyester resin particle dispersion liquid (M6)

Yellow colorant (C.I. Pigment Yellow 74)-containing amorphous polyester resin particle dispersion liquid (Y6)

Black colorant (carbon black)-containing amorphous polyester resin particle dispersion liquid (K6)

Preparation of Amorphous Polyester Resin Particle Dispersion Liquids Containing Various Colorants (C7/M7/Y7/K7)

The following amorphous polyester resin particle dispersion liquids containing various colorants are prepared as in the preparation of the cyan colorant (C.I. Pigment Blue 15:3)-containing amorphous polyester resin particle dispersion liquid (C1), except that the amount of the anionic surfactant "TaycaPower" produced by TAYCA CORPORATION (solid content: 12%, sodium dodecylbenzenesulfonate) charged from the fourth barrel of the twin screw extruder is changed from 40 parts to 55 parts.

Cyan colorant (C.I. Pigment Blue 15:3)-containing amorphous polyester resin particle dispersion liquid (C7)

Magenta colorant (C.I. Pigment Red 269)-containing amorphous polyester resin particle dispersion liquid (M7)

Yellow colorant (C.I. Pigment Yellow 74)-containing amorphous polyester resin particle dispersion liquid (Y7)

Black colorant (carbon black)-containing amorphous polyester resin particle dispersion liquid (K7)

Preparation of Crystalline Polyester Resin Particle Dispersion Liquid (B1)

1,10-Decanedicarboxylic acid: 260 parts 1,6-Hexanediol: 167 parts

Dibutyltin oxide (catalyst): 0.3 parts

The above materials are charged into a three-necked flask dried by heating. The air inside the flask is replaced with a nitrogen gas to create an inert atmosphere. Then, stirring and reflux are performed at 180° C. for 5 hours by mechanical stirring. Subsequently, the temperature is gradually increased to 230° C. under reduced pressure. Then, stirring is performed for 2 hours. After the viscosity has been increased to a sufficiently high level, air cooling is performed to stop the reaction. Hereby, a crystalline polyester resin having a weight average molecular weight of 12,500 and a melting temperature of 73° C. is prepared. With 90 parts of the crystalline polyester resin, 1.8 parts of anionic surfactant "TaycaPower" produced by TAYCA CORPORATION (solid content: 12%, sodium dodecylbenzenesulfonate) and 210 parts of ion-exchange water are mixed. After the resulting mixture has been heated to 120° C., it is dispersed with a homogenizer "ULTRA-TURRAX T50" produced by IKA. Subsequently, a dispersion treatment is performed for 1 hour with a pressure-discharge Gaulin homogenizer. Hereby, a resin particle dispersion liquid containing resin particles having a volume average size of 195 nm which are dispersed therein is prepared. The solid content in the resin particle dispersion liquid is adjusted to be 20% by the addition of ion-exchange water. Hereby, a crystalline polyester resin particle dispersion liquid (B1) is prepared.

Preparation of Crystalline Polyester Resin Particle Dispersion Liquid (B2)

1,8-Octanedicarboxylic acid: 260 parts 1,6-Hexanediol: 167 parts

Dibutyltin oxide (catalyst): 0.3 parts

The above materials are charged into a three-necked flask dried by heating. The air inside the flask is replaced with a nitrogen gas to create an inert atmosphere. Then, stirring and reflux are performed at 180° C. for 5 hours by mechanical stirring. Subsequently, the temperature is gradually increased to 230° C. under reduced pressure. Then, stirring is performed for 2 hours. After the viscosity has been increased to a sufficiently high level, air cooling is performed to stop the reaction. Hereby, a crystalline polyester resin having a weight average molecular weight of 12,500 and a melting temperature of 73° C. is prepared. With 90 parts of the crystalline polyester resin, 1.8 parts of anionic surfactant "TaycaPower" produced by TAYCA CORPORATION (solid content: 12%, sodium dodecylbenzenesulfonate) and 210 parts of ion-exchange water are mixed. After the resulting mixture has been heated to 120° C., it is dispersed with a homogenizer "ULTRA-TURRAX T50" produced by IKA. Subsequently, a dispersion treatment is performed for 1 hour with a pressure-discharge Gaulin homogenizer. Hereby, a resin particle dispersion liquid containing resin particles having a volume average size of 195 nm which are dispersed therein is prepared. The solid content in the resin particle dispersion liquid is adjusted to be 20% by the addition of ion-exchange water. Hereby, a crystalline polyester resin particle dispersion liquid (B2) is prepared.

Preparation of Styrene Acrylic Resin Particle Dispersion Liquid (S1)

Styrene: 375 parts n-Butyl acrylate: 25 parts

Acrylic acid: 2 parts

Dodecanethiol: 24 parts

Carbon tetrabromide: 4 parts

The above materials are mixed together to form a solution. In a flask, the mixed solution is dispersed in a surfactant solution prepared by dissolving 6 parts of a non-ionic surfactant "NONIPOL 400" produced by Sanyo Chemical Industries, Ltd. and 10 parts of an anionic surfactant "TaycaPower" produced by TAYCA CORPORATION (solid content: 12%, sodium dodecylbenzenesulfonate) in 550 parts of ion-exchange water to perform emulsification. While the inside of the flask is stirred, an aqueous solution prepared by dissolving 4 parts of ammonium persulfate in 50 parts of ion-exchange water is charged into the flask over 20 minutes. After nitrogen purging has been performed, while the inside of the flask is stirred, heating is performed with an oil bath until the temperature of the contents reaches 70° C. The temperature is maintained at 70° C. for 5 hours to continue emulsion polymerization. Hereby, a resin particle dispersion liquid containing resin particles having a volume average size of 150 nm dispersed therein is prepared. The solid content in the resin particle dispersion liquid is adjusted to be 20% by the addition of ion-exchange water. Hereby, a styrene acrylic resin particle dispersion liquid (S1) is prepared.

Preparation of Hybrid Resin (Amorphous Resin Including Amorphous Polyester Resin Segment and Styrene Acrylic Resin Segment) Particle Dispersion Liquid (SPE1)

The inside of a four-necked flask equipped with a nitrogen introduction tube, a dewatering tube, a stirrer, and a thermocouple is purged with nitrogen. Into the flask, 5,670 parts of polyoxypropylene(2.2)-2,2-bis(4-hydroxyphenyl)propane, 585 parts of polyoxyethylene(2.0)-2,2-bis(4-hydroxyphenyl)propane, 2,450 parts of terephthalic acid, and 44 parts of tin(II) di(2-ethylhexanoate) are charged. Then, the temperature is increased to 235° C. in a nitrogen atmosphere while the resulting mixture is stirred. After the mixture has been held for 5 hours, the pressure inside the flask is reduced. Subsequently, holding is performed at 8.0 kPa for 1 hour. After the pressure has been increased to atmospheric pressure, the temperature is reduced to 190° C. Then, 42 parts of fumaric acid and 207 parts of trimellitic acid are added to the flask. After holding has been performed at 190° C. for 2 hours, the temperature is increased to 210° C. over 2 hours. Subsequently, the pressure inside the flask is reduced. Then, holding is performed at 8.0 kPa for 4 hours. Hereby, an amorphous polyester resin A (i.e., polyester segment) is prepared.

To a four-necked flask equipped with a cooling tube, a stirrer, and a thermocouple, 800 parts of the amorphous polyester resin A is added. The resulting mixture is stirred at 200 rpm in a nitrogen atmosphere. Subsequently, as addition polymerizable monomers, 40 parts of styrene, 142 parts of ethyl acrylate, 16 parts of acrylic acid, 2 parts of 1,10-decanediol diacrylate, and 1,000 parts of toluene are added to the flask. The resulting mixture is stirred for 30 minutes.

Into the flask, 6 parts of polyoxyethylene alkyl ether (non-ionic surfactant "EMULGEN 430" produced by Kao Corporation), 40 parts of a 15% aqueous sodium dodecylbenzene sulfonate solution (anionic surfactant "NEOPELEX G-15" produced by Kao Corporation), and 233 parts of 5% potassium hydroxide are further charged. While the resulting mixture is stirred, the temperature is increased to 95° C. in order to perform melting. Subsequently, stirring is performed at 95° C. for 2 hours. Hereby, a resin mixture solution is prepared.

While the resin mixture solution is stirred, 1,145 parts of deionized water is added dropwise to the flask at 6 part/min to produce an emulsified product. The emulsified product is cooled to 25° C. and then passed through a 200-mesh screen. The solid content of the resulting dispersion liquid is adjusted to be 30% by the addition of deionized water. Hereby, a hybrid resin particle dispersion liquid (SPE1) is prepared.

The ratio of the amount of the styrene-derived structural unit of the synthesized hybrid resin to the total amount of the hybrid resin is 4% by mass.

Preparation of Release Agent Particle Dispersion Liquid (W1)

Ester wax "WEP-8" produced by NOF CORPORATION (melting temperature: 79° C.): 100 parts Anionic surfactant "TaycaPower" produced by TAYCA CORPORATION (sodium dodecylbenzenesulfonate): 1 part Ion-exchange water: 350 parts The above materials are mixed with one another and heated to 100° C. The resulting mixture is dispersed with a homogenizer "ULTRA-TURRAX T50" produced by IKA and then further dispersed with a pressure-discharge Gaulin homogenizer. Hereby, a release agent particle dispersion liquid in which release agent particles having a volume average size of 220 nm are dispersed is prepared. The solid content in the release agent particle dispersion liquid is adjusted to be 20% by the addition of ion-exchange water. Hereby, a release agent particle dispersion liquid (W1) is prepared.

Preparation of Release Agent Particle Dispersion Liquid (W2)

Carnauba wax "RC-160" produced by Toa Kasei Co., Ltd. (melting temperature: 84° C.): 100 parts Anionic surfactant "TaycaPower" produced by TAYCA CORPORATION (sodium dodecylbenzenesulfonate): 1 part Ion-exchange water: 350 parts The above materials are mixed with one another and heated to 100° C. The resulting mixture is dispersed with a homogenizer "ULTRA-TURRAX T50" produced by IKA and then further dispersed with a pressure-discharge Gaulin homogenizer. Hereby, a release agent particle dispersion liquid in which release agent particles having a volume average size of 220 nm are dispersed is prepared. The solid content in the release agent particle dispersion liquid is adjusted to be 20% by the addition of ion-exchange water. Hereby, a release agent particle dispersion liquid (W2) is prepared.

Example 1

Preparation of Toner Particles

Ion-exchange water: 200 parts

Cyan colorant-containing amorphous polyester resin particle dispersion liquid (C1): 145 parts Styrene acrylic resin particle dispersion liquid (S1): 30 parts Release agent particle dispersion liquid (W1): 10 parts The above materials are charged into a round-bottom flask made of stainless steel. After the pH has been adjusted to be 3.5 by the addition of 0.1 N (0.1 mol/L) nitric acid, an aqueous magnesium chloride solution prepared by dissolving 6 parts of magnesium chloride in 30 parts of ion-exchange water is added to the flask. After dispersion has been performed with a homogenizer "ULTRA-TURRAX T50" produced by IKA at 30° C., the temperature is increased to 45° C. in a heating oil bath. Then, holding is performed until the volume average particle size reaches 4.5 μm.

Subsequently, 30 parts of the amorphous polyester resin particle dispersion liquid (A1) and 15 parts of the crystalline polyester resin particle dispersion liquid (B1) are added. Then, holding is performed for 30 minutes. The addition of the two dispersion liquids is conduced 4 times in total at intervals of 30 minutes.

Subsequently, 40 parts of the amorphous polyester resin particle dispersion liquid (A1) is added. The pH is adjusted to be 9.0 using a 1N aqueous sodium hydroxide solution.

Subsequently, while stirring is continued, the temperature is increased to 85° C. at a heating rate of 0.05° C./min. After holding has been performed at 85° C. for 3 hours, the temperature is reduced to 30° C. at 15° C./min (i.e., first cooling). Then, the temperature is increased to 85° C. at a heating rate of 0.2° C./min (i.e., reheating). Subsequently, after holding has been performed for 30 minutes, the temperature is cooled to 30° C. at 0.5° C./min (i.e., second cooling).

Subsequently, the solid content is separated by filtration, cleaned with ion-exchange water, and then dried. Hereby, cyan toner particles (C1) having a volume average size of 5.9 μm are prepared.

Addition of External Additive

With 100 parts of the cyan toner particles (C1), 1.5 parts of hydrophobic silica "RY50" produced by Nippon Aerosil Co., Ltd. is mixed. The resulting mixture is stirred with a sample mill at a rotation speed of 10,000 rpm for 30 seconds. Then, sieving is performed with a vibration sieve having an opening of 45 μm. Hereby, a cyan toner (C1) is prepared. The cyan toner (C1) has a volume average particle size of 5.9 μm.

Preparation of Carrier

After 500 parts of spherical magnetite powder particles (volume average size: 0.55 μm) have been stirred with a Henschel mixer, 5 parts of a titanate coupling agent is added to the magnetite powder particles. The resulting mixture is heated to 100° C. and then stirred for 30 minutes. Subsequently, 6.25 parts of phenol, 9.25 parts of 35% formalin, 500 parts of the magnetite particles treated with a titanate coupling agent, 6.25 parts of 25% ammonia water, and 425 parts of water are charged into a four-necked flask. While stirring is performed, a reaction is conducted at 85° C. for 120 minutes. Subsequently, the temperature is reduced to 25° C. After 500 parts of water has been added to the flask, the supernatant is removed and the precipitate is cleaned with water. The cleaned precipitate is dried by being heated under reduced pressure. Hereby, a carrier (CA) having an average particle size of 35 μm is prepared.

Mixing of Toner and Carrier

The cyan toner (C1) and the carrier (CA) are charged into a V-blender at a mass ratio of Toner(C1):Carrier(CA)=5:95. The resulting mixture is stirred for 20 minutes to form a cyan developer (C1).

Preparation of Developers

Magenta toner particles (M1), yellow toner particles (Y1), and black toner particles (K1) are produced as in the preparation of the cyan toner particles (C1), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A magenta developer (M1), a yellow developer (Y1), and a black developer (K1) are prepared as in the preparation of the cyan developer (C1), except that the magenta toner particles (M1), the yellow toner particles (Y1), and the black toner particles (K1) are used instead of the cyan toner particles (C1).

The set of the cyan, magenta, yellow, and black developers is considered as a set of developers of Example 1.

Examples 2 and 4 and Comparative Example 1

Cyan toner particles (C2, C4, and C6), magenta toner particles (M2, M4, and M6), yellow toner particles (Y2, Y4, and Y6), and black toner particles (K2, K4, and K6) are prepared as in the preparation of the cyan toner particles (C1), except that the cyan colorant-containing amorphous polyester resin particle dispersion liquid (C1) is changed to the cyan colorant-containing amorphous polyester resin particle dispersion liquids (C2, C4, and C6), the magenta colorant-containing amorphous polyester resin particle dispersion liquids (M2, M4, and M6), the yellow colorant-containing amorphous polyester resin particle dispersion liquids (Y2, Y4, and Y6), and the black colorant-containing amorphous polyester resin particle dispersion liquids (K2, K4, and K6), respectively, and an aqueous calcium chloride solution prepared by dissolving 3 parts of calcium chloride in 30 parts of ion-exchange water is used in combination with the aqueous magnesium chloride solution.

Cyan developers (C2, C4, and C6), magenta developers (M2, M4, and M6), yellow developers (Y2, Y4, and Y6), and black developers (K2, K4, and K6) are prepared as in the preparation of the cyan developer (C1), except that the cyan toner particles (C2, C4, and C6), the magenta toner particles (M2, M4, and M6), the yellow toner particles (Y2, Y4, and Y6), and the black toner particles (K2, K4, and K6) are used instead of the cyan toner particles (C1).

The sets of the cyan, magenta, yellow, and black developers are considered as sets of developers of Example 2, Comparative example 1, and Example 4.

Examples 3 and 5 and Comparative Example 2

Cyan toner particles (C3, C5, and C7), magenta toner particles (M3, M5, and M7), yellow toner particles (Y3, Y5, and Y7), and black toner particles (K3, K5, and K7) are prepared as in the preparation of the cyan toner particles (C1), except that the cyan colorant-containing amorphous polyester resin particle dispersion liquid (C1) is changed to the cyan colorant-containing amorphous polyester resin particle dispersion liquids (C3, C5, and C7), the magenta colorant-containing amorphous polyester resin particle dispersion liquids (M3, M5, and M7), the yellow colorant-containing amorphous polyester resin particle dispersion liquids (Y3, Y5, and Y7), and the black colorant-containing amorphous polyester resin particle dispersion liquids (K3, K5, and K7), respectively.

Cyan developers (C3, C5, and C7), magenta developers (M3, M5, and M7), yellow developers (Y3, Y5, and Y7), and black developers (K3, K5, and K7) are prepared as in the preparation of the cyan developer (C1), except that the cyan toner particles (C3, C5, and C7), the magenta toner particles (M3, M5, and M7), the yellow toner particles (Y3, Y5, and Y7), and the black toner particles (K3, K5, and K7) are used instead of the cyan toner particles (C1).

The sets of the cyan, magenta, yellow, and black developers are considered as sets of developers of Example 3, Comparative example 2, and Example 5.

Example 6

Cyan toner particles (C8) are prepared as in the preparation of the cyan toner particles (C1), except that an aqueous calcium chloride solution prepared by dissolving 2 parts of calcium chloride in 30 parts of ion-exchange water is used in combination with the aqueous magnesium chloride solution. Magenta toner particles (M8), yellow toner particles (Y8), and black toner particles (K8) are produced as in the preparation of the cyan toner particles (C8), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C8), a magenta developer (M8), a yellow developer (Y8), and a black developer (K8) are prepared as in the preparation of the cyan developer (C1), except that the cyan toner particles (C8), the magenta toner particles (M8), the yellow toner particles (Y8), and the black toner particles (K8) are used instead of the cyan toner particles (C1).

The set of the cyan, magenta, yellow, and black developers is considered as a set of developers of Example 6.

Example 7

Cyan toner particles (C9) are prepared as in the preparation of the cyan toner particles (C1), except that an aqueous calcium chloride solution prepared by dissolving 4 parts of calcium chloride in 30 parts of ion-exchange water is used in combination with the aqueous magnesium chloride solution. Magenta toner particles (M9), yellow toner particles (Y9), and black toner particles (K9) are produced as in the preparation of the cyan toner particles (C9), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C9), a magenta developer (M9), a yellow developer (Y9), and a black developer (K9) are prepared as in the preparation of the cyan developer (C1), except that the cyan toner particles (C9), the magenta toner particles (M9), the yellow toner particles (Y9), and the black toner particles (K9) are used instead of the cyan toner particles (C1).

The set of the cyan, magenta, yellow, and black developers is considered as a set of developers of Example 7.

Example 8

Cyan toner particles (C10) are prepared as in the preparation of the cyan toner particles (C1), except that the crystalline polyester resin particle dispersion liquid (B1) is changed to the crystalline polyester resin particle dispersion liquid (B2). Magenta toner particles (M10), yellow toner particles (Y10), and black toner particles (K10) are produced as in the preparation of the cyan toner particles (C10), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C10), a magenta developer (M10), a yellow developer (Y10), and a black developer (K10) are prepared as in the preparation of the cyan developer (C1), except that the cyan toner particles (C10), the magenta toner particles (M10), the yellow toner particles (Y10), and the black toner particles (K10) are used instead of the cyan toner particles (C1).

The set of the cyan, magenta, yellow, and black developers is considered as a set of developers of Example 8.

Example 9

Cyan toner particles (C11) are prepared as in the preparation of the cyan toner particles (C1), except that the release agent particle dispersion liquid (W1) is changed to the release agent particle dispersion liquid (W2). Magenta toner particles (M11), yellow toner particles (Y11), and black toner particles (K11) are produced as in the preparation of the cyan toner particles (C11), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C11), a magenta developer (M11), a yellow developer (Y11), and a black developer (K11) are prepared as in the preparation of the cyan developer (C1), except that the cyan toner particles (C11), the magenta toner particles (M11), the yellow toner particles (Y11), and the black toner particles (K11) are used instead of the cyan toner particles (C1).

The set of the cyan, magenta, yellow, and black developers is considered as a set of developers of Example 9.

Example 10

Cyan toner particles (C12) are prepared as in the preparation of the cyan toner particles (C1), except that the amount of styrene acrylic resin particle dispersion liquid (S1) is changed from 30 parts to 50 parts and the amount of crystalline polyester resin particle dispersion liquid (B1), which is used 4 times in total, is changed from 15 parts to 20 parts. Magenta toner particles (M12), yellow toner particles (Y12), and black toner particles (K12) are produced as in the preparation of the cyan toner particles (C12), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C12), a magenta developer (M12), a yellow developer (Y12), and a black developer (K12) are prepared as in the preparation of the cyan developer (C1), except that the cyan toner particles (C12), the magenta toner particles (M12), the yellow toner particles (Y12), and the black toner particles (K12) are used instead of the cyan toner particles (C1).

The set of the cyan, magenta, yellow, and black developers is considered as a set of developers of Example 10.

Example 11

Cyan toner particles (C13) are prepared as in the preparation of the cyan toner particles (C1), except that the amount of styrene acrylic resin particle dispersion liquid (S1) is changed from 30 parts to 10 parts, the amount of release agent particle dispersion liquid (W1) is changed from 10 parts to 5 parts, and the amount of crystalline polyester resin particle dispersion liquid (B1), which is used 4 times in total, is changed from 15 parts to 2.5 parts. Magenta toner particles (M13), yellow toner particles (Y13), and black toner particles (K13) are produced as in the preparation of the cyan toner particles (C13), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C13), a magenta developer (M13), a yellow developer (Y13), and a black developer (K13) are prepared as in the preparation of the cyan developer (C1), except that the cyan toner particles (C13), the magenta toner particles (M13), the yellow toner particles (Y13), and the black toner particles (K13) are used instead of the cyan toner particles (C1).

The set of the cyan, magenta, yellow, and black developers is considered as a set of developers of Example 11.

Example 12

Cyan toner particles (C14) are prepared as in the preparation of the cyan toner particles (C1), except that the amount of styrene acrylic resin particle dispersion liquid (S1) is changed from 30 parts to 50 parts, the amount of release agent particle dispersion liquid (W1) is changed from 10 parts to 40 parts, and the amount of crystalline polyester resin particle dispersion liquid (B1), which is used 4 times in total, is changed from 15 parts to 20 parts. Magenta toner particles (M14), yellow toner particles (Y14), and black toner particles (K14) are produced as in the preparation of the cyan toner particles (C14), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C14), a magenta developer (M14), a yellow developer (Y14), and a black developer (K14) are prepared as in the preparation of the cyan developer (C1), except that the cyan toner particles (C14), the magenta toner particles (M14), the yellow toner particles (Y14), and the black toner particles (K14) are used instead of the cyan toner particles (C1).

The set of the cyan, magenta, yellow, and black developers is considered as a set of developers of Example 12.

Example 13

Cyan toner particles (C15) are prepared as in the preparation of the cyan toner particles (C1), except that the amount of styrene acrylic resin particle dispersion liquid (S1) is changed from 30 parts to 10 parts, the amount of release agent particle dispersion liquid (W1) is changed from 10 parts to 5 parts, and the amount of crystalline polyester resin particle dispersion liquid (B1), which is used 4 times in total, is changed from 15 parts to 0 part. Magenta toner particles (M15), yellow toner particles (Y15), and black toner particles (K15) are produced as in the preparation of the cyan toner particles (C15), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C15), a magenta developer (M15), a yellow developer (Y15), and a black developer (K15) are prepared as in the preparation of the cyan developer (C1), except that the cyan toner particles (C15), the magenta toner particles (M15), the yellow toner particles (Y15), and the black toner particles (K15) are used instead of the cyan toner particles (C1).

The set of the cyan, magenta, yellow, and black developers is considered as a set of developers of Example 13.

Example 14

Cyan toner particles (C16) are prepared as in the preparation of the cyan toner particles (C1), except that the amorphous polyester resin particle dispersion liquid (A1) is changed to the hybrid resin (amorphous resin including an amorphous polyester resin segment and a styrene acrylic resin segment) particle dispersion liquid (SPE1). Magenta toner particles (M16), yellow toner particles (Y16), and black toner particles (K16) are produced as in the preparation of the cyan toner particles (C16), except that the cyan colorant-containing amorphous polyester resin particle dispersion liquid (C1) is changed to the magenta colorant-containing amorphous polyester resin particle dispersion liquid (M1), the yellow colorant-containing amorphous polyester resin particle dispersion liquid (Y1), and the black colorant-containing amorphous polyester resin particle dispersion liquid (K1), respectively.

A cyan developer (C16), a magenta developer (M16), a yellow developer (Y16), and a black developer (K16) are prepared as in the preparation of the cyan developer (C1), except that the cyan toner particles (C16), the magenta toner particles (M16), the yellow toner particles (Y16), and the black toner particles (K16) are used instead of the cyan toner particles (C1).

The set of the cyan, magenta, yellow, and black developers is considered as a set of developers of Example 14.

Measurement of Net Intensities of Elements

For each of the sets of developers prepared in Examples and Comparative examples, the net intensities of the following elements included in toner particles constituting the cyan developer are measured by the above-described method. Table 1 lists the results. Note that the net intensities of the elements included in toner particles constituting the magenta, yellow, and black developers are substantially the same as the net intensities of the elements included in toner particles constituting the cyan developer.

Net intensity $N_S$ of sulfur (In Table 2, referred to as "S($N_S$)")

Total net intensity $N_A$ of alkali metals and alkaline-earth metals (in Table 2, referred to as "ALKALI($N_A$)")

Net intensity $N_N$ of Na (in Table 2, referred to as "Na ($N_N$)")

Net intensity $N_M$ of Mg (in Table 2, referred to as "Mg($N_M$)")

Net intensity $N_{Ca}$ of Ca (in Table 2, referred to as "Ca($N_{Ca}$)")

Total net intensity $N_{A\text{-}NMC}$ of alkali metals and alkaline-earth metals other than Na, Mg, or Ca (in Table 2, referred to as "ALKALI-(Na+Mg+Ca) ($N_{A\text{-}NMC}$)")

Net intensity $N_{Cl}$ of chlorine (in Table 2, referred to as "Cl($N_{Cl}$)")

Area fraction [%] of region in which the colorant is dispersed to cross section of toner particle Evaluation of Color Gamut A specific one of the sets of developers prepared in Examples and Comparative examples is charged to a developing device of a modification of the image forming apparatus "ApeosPortIV C5575" produced by Fuji Xerox Co., Ltd. Using the modified image forming apparatus, the amount of developing toner used for forming 100% cyan, magenta, yellow, or black image on OK Top Coated Paper is adjusted to 4.0 g/$m^2$, and a 5 cm×5 cm cyan/magenta secondary color image composed of 100% cyan toner and 100% magenta toner, a 5 cm×5 cm cyan/yellow secondary color image composed of 100% cyan toner and 100% yellow toner, and a 5 cm×5 cm magenta/yellow secondary color image composed of 100% magenta toner and 100% yellow toner are formed. The density (L*) and saturation ($C^*=(a^{*2}+b^{*2})^{0.5}$) of each of the above images are measured. In the measurement, the surfaces of the images are measured 10 times in a random fashion with "X-Rite 939" (aperture: 4 mm).

The evaluation is made in accordance with the following standards.

Density of Cyan/Magenta (C/M) Secondary Color Image

G5: L* is less than 18

G4: L* is 18 or more and less than 19

G3: L* is 19 or more and less than 20

G2: L* is 20 or more and less than 21

G1: L* is 21 or more

The smaller the density (L*) of the cyan/magenta (C/M) secondary color image, the higher the image density. The grades G3 to G5 are considered acceptable.

Saturation of Cyan/Magenta (C/M) Secondary Color Image

G5: C* is 56 or more

G4: C* is 54 or more and less than 56

G3: C* is 52 or more and less than 54

G2: C* is 50 or more and less than 52

G1: C* is less than 50

The larger the saturation (C*) of the cyan/magenta (C/M) secondary color image, the higher the image saturation. The grades G3 to G5 are considered acceptable.

Density of Cyan/Yellow (C/Y) Secondary Color Image

G5: L* is less than 48

G4: L* is 48 or more and less than 49

G3: L* is 49 or more and less than 50

G2: L* is 50 or more and less than 51

G1: L* is 51 or more

The smaller the density (L*) of the cyan/yellow (C/Y) secondary color image, the higher the image density. The grades G3 to G5 are considered acceptable.

Saturation of Cyan/Yellow (C/Y) Secondary Color Image

G5: C* is 76 or more

G4: C* is 74 or more and less than 76

G3: C* is 72 or more and less than 74

G2: C* is 70 or more and less than 72

G1: C* is less than 70

The larger the saturation (C*) of the cyan/yellow (C/Y) secondary color image, the higher the image saturation. The grades G3 to G5 are considered acceptable.

Density of Magenta/Yellow (M/Y) Secondary Color Image

G5: L* is less than 47

G4: L* is 47 or more and less than 48

G3: L* is 48 or more and less than 49

G2: L* is 49 or more and less than 50

G1: L* is 50 or more

The smaller the density (L*) of the magenta/yellow (M/Y) secondary color image, the higher the image density. The grades G3 to G5 are considered acceptable.

Saturation of Magenta/Yellow (M/Y) Secondary Color Image

G5: C* is 90 or more

G4: C* is 88 or more and less than 90

G3: C* is 86 or more and less than 88

G2: C* is 84 or more and less than 86

G1: C* is less than 84

The larger the saturation (C*) of the magenta/yellow (M/Y) secondary color image, the higher the image saturation. The grades G3 to G5 are considered acceptable.

Evaluation of Transfer Efficiency

A specific one of the sets of developers prepared in Examples and Comparative examples is charged to a developing device of a modification of the image forming apparatus "ApeosPortIV C5575" produced by Fuji Xerox Co., Ltd. After the developers have been left to stand for 1 day in a high temperature and high humidity environment (30° C., 85% RH), an image having an area coverage of 1% is formed on 10,000 sheets using the modified image forming apparatus.

Subsequently, a 3 cm×4 cm cyan solid patch is developed and transferred to an intermediate transfer belt. The toner image transferred on the intermediate transfer belt is taken using the adhesion of the surface of an adhesive tape. The mass (W1) of the toner image is measured. Then, a toner image formed as described above is transferred onto the surface of a paper sheet. The mass (W2) of the transferred image is measured. The transfer efficiency is calculated using the following formula on the basis of the above results.

Transfer efficiency (%)=(W2/W1)×100

A (Good): 90% or more

B (Fair): 80% or more and less than 90%

C (Poor): less than 80%

TABLE 1

| | Developer | | | |
|---|---|---|---|---|
| | Type | Crystalline resin (type of polycarboxylic acid/type of polyhydric alcohol) | Release agent | Area fraction of region in which colorant is dispersed [%] |
| Example 1 | Developer C1/M1/Y1/K1 | 1,10-DDA/1,6-HDO | Ester wax | 75 |
| Example 2 | Developer C2/M2/Y2/K2 | 1,10-DDA/1,6-HDO | Ester wax | 72 |
| Example 3 | Developer C3/M3/Y3/K3 | 1,10-DDA/1,6-HDO | Ester wax | 78 |
| Comparative example 1 | Developer C4/M4/Y4/K4 | 1,10-DDA/1,6-HDO | Ester wax | 73 |
| Comparative example 2 | Developer C5/M5/Y5/K5 | 1,10-DDA/1,6-HDO | Ester wax | 76 |
| Example 4 | Developer C6/M6/Y6/K6 | 1,10-DDA/1,6-HDO | Ester wax | 72 |
| Example 5 | Developer C7/M7/Y7/K7 | 1,10-DDA/1,6-HDO | Ester wax | 78 |
| Example 6 | Developer C8/M8/Y8/K8 | 1,10-DDA/1,6-HDO | Ester wax | 74 |
| Example 7 | Developer C9/M9/Y9/K9 | 1,10-DDA/1,6-HDO | Ester wax | 73 |
| Example 8 | Developer C10/M10/Y10/K10 | 1,8-ODA/1,6-HDO | Ester wax | 74 |
| Example 9 | Developer C11/M11/Y11/K11 | 1.10-DDA/1,6-HDO | Carnauba wax | 75 |
| Example 10 | Developer C12/M12/Y12/K12 | 1.10-DDA/1,6-HDO | Ester wax | 65 |
| Example 11 | Developer C13/M13/Y13/K13 | 1.10-DDA/1,6-HDO | Ester wax | 94 |

TABLE 1-continued

| | Developer | | | |
|---|---|---|---|---|
| | Type | Crystalline resin (type of polycarboxylic acid/ type of polyhydric alcohol) | Release agent | Area fraction of region in which colorant is dispersed [%] |
| Example 12 | Developer C14/M14/Y14/K14 | 1.10-DDA/1,6-HDO | Ester wax | 58 |
| Example 13 | Developer C15/M15/Y15/K15 | 1.10-DDA/1,6-HDO | Ester wax | 97 |
| Example 14 | Developer C16/M16/Y16/K16 | 1.10-DDA/1,6-HDO | Ester wax | 74 |

TABLE 2

| | Net intensities of elements [kcps] | | | | | | |
|---|---|---|---|---|---|---|---|
| | S ($N_S$) | ALKALI ($N_A$) | Na ($N_N$) | Mg ($N_M$) | Ca ($N_{Ca}$) | ALKALI − (Na + Mg + Ca) ($N_{A-NMC}$) | Cl ($N_{Cl}$) |
| Example 1 | 4.5 | 0.26 | 0.03 | 0.23 | 0.0 | 0.0 | 0.2 |
| Example 2 | 3.4 | 2.46 | 0.02 | 0.24 | 2.2 | 0.1 | 1.0 |
| Example 3 | 6.0 | 0.28 | 0.03 | 0.25 | 0.0 | 0.0 | 0.2 |
| Comparative example 1 | 2.0 | 2.77 | 0.03 | 0.24 | 2.5 | 0.2 | 1.0 |
| Comparative example 2 | 8.0 | 0.28 | 0.03 | 0.25 | 0.0 | 0.0 | 0.1 |
| Example 4 | 3.6 | 2.78 | 0.03 | 0.25 | 2.5 | 0.0 | 1.0 |
| Example 5 | 5.4 | 0.28 | 0.03 | 0.25 | 0.0 | 0.0 | 0.2 |
| Example 6 | 4.5 | 2.28 | 0.03 | 0.25 | 2.0 | 0.1 | 1.0 |
| Example 7 | 4.5 | 4.09 | 0.10 | 0.29 | 3.7 | 0.2 | 1.2 |
| Example 8 | 4.4 | 0.26 | 0.03 | 0.23 | 0.0 | 0.0 | 0.2 |
| Example 9 | 4.5 | 0.26 | 0.03 | 0.23 | 0.0 | 0.1 | 0.2 |
| Example 10 | 4.3 | 0.27 | 0.03 | 0.24 | 0.0 | 0.0 | 0.2 |
| Example 11 | 4.6 | 0.28 | 0.03 | 0.25 | 0.0 | 0.0 | 0.3 |
| Example 12 | 4.4 | 0.27 | 0.03 | 0.24 | 0.0 | 0.0 | 0.2 |
| Example 13 | 4.5 | 0.28 | 0.03 | 0.25 | 0.0 | 0.0 | 0.2 |
| Example 14 | 4.5 | 0.27 | 0.03 | 0.24 | 0.0 | 0.1 | 0.2 |

| | Net intensities of elements [kcps] | | | | | | | | |
|---|---|---|---|---|---|---|---|---|---|
| | $N_S/N_A$ | $N_S-N_A$ | $N_S/N_N$ | $N_S-N_N$ | $N_S/N_M$ | $N_S-N_M$ | $N_S/N_{Ca}$ | $N_S-N_{Ca}$ | $N_S/N_{Cl}$ |
| Example 1 | 17.3 | 4.2 | 150.0 | 4.5 | 19.6 | 4.3 | | 4.5 | 23 |
| Example 2 | 1.4 | 0.9 | 170.0 | 3.4 | 14.2 | 3.2 | 1.5 | 1.2 | 3 |
| Example 3 | 21.4 | 5.7 | 200.0 | 6.0 | 24.0 | 5.8 | | 6.0 | 30 |
| Comparative example 1 | 0.7 | −0.8 | 66.7 | 2.0 | 8.3 | 1.8 | 0.8 | −0.5 | 2 |
| Comparative example 2 | 28.6 | 7.7 | 266.7 | 8.0 | 32.0 | 7.8 | | 8.0 | 80 |
| Example 4 | 1.3 | 0.8 | 120.0 | 3.6 | 14.4 | 3.4 | 1.4 | 1.1 | 4 |
| Example 5 | 19.3 | 5.1 | 180.0 | 5.4 | 21.6 | 5.2 | | 5.4 | 27 |
| Example 6 | 2.0 | 2.2 | 150.0 | 4.5 | 18.0 | 4.3 | 2.3 | 2.5 | 5 |
| Example 7 | 1.1 | 0.4 | 45.0 | 4.4 | 15.5 | 4.2 | 1.2 | 0.8 | 4 |
| Example 8 | 16.9 | 4.1 | 146.7 | 4.4 | 19.1 | 4.2 | | 4.4 | 22 |
| Example 9 | 17.3 | 4.2 | 150.0 | 4.5 | 19.6 | 4.3 | | 4.5 | 23 |
| Example 10 | 15.9 | 4.0 | 143.3 | 4.3 | 17.9 | 4.1 | | 4.3 | 22 |
| Example 11 | 16.4 | 4.3 | 153.3 | 4.6 | 18.4 | 4.4 | | 4.6 | 15 |
| Example 12 | 16.3 | 4.1 | 146.7 | 4.4 | 18.3 | 4.2 | | 4.4 | 22 |
| Example 13 | 16.1 | 4.2 | 150.0 | 4.5 | 18.0 | 4.3 | | 4.5 | 23 |
| Example 14 | 16.7 | 4.2 | 150.0 | 4.5 | 18.8 | 4.3 | | 4.5 | 23 |

TABLE 3

| | Densities of secondary color images | | | Saturation of secondary color images | | | Transfer |
|---|---|---|---|---|---|---|---|
| | C/M | C/Y | M/Y | C/M | C/Y | M/Y | efficiency |
| Example 1 | G5 | G5 | G5 | G5 | G5 | G5 | A(Good) |
| Example 2 | G4 | G4 | G4 | G4 | G4 | G4 | A(Good) |
| Example 3 | G5 | G5 | G5 | G5 | G5 | G5 | B(Fair) |
| Comparative example 1 | G1 | G1 | G1 | G1 | G1 | G1 | A(Good) |
| Comparative example 2 | G3 | G3 | G3 | G3 | G3 | G3 | C(Poor) |
| Example 4 | G5 | G5 | G4 | G5 | G5 | G4 | A(Good) |
| Example 5 | G5 | G4 | G4 | G5 | G4 | G4 | B(Fair) |
| Example 6 | G4 | G5 | G4 | G4 | G5 | G4 | A(Good) |
| Example 7 | G4 | G4 | G5 | G4 | G4 | G5 | A(Good) |
| Example 8 | G4 | G5 | G4 | G4 | G5 | G4 | B(Fair) |
| Example 9 | G4 | G4 | G4 | G4 | G4 | G5 | A(Good) |
| Example 10 | G4 | G4 | G4 | G3 | G3 | G3 | A(Good) |
| Example 11 | G5 | G4 | G4 | G5 | G5 | G5 | A(Good) |
| Example 12 | G3 | G3 | G3 | G3 | G3 | G3 | A(Good) |
| Example 13 | G5 | G5 | G4 | G5 | G5 | G5 | B(Fair) |
| Example 14 | G4 | G4 | G4 | G4 | G4 | G4 | A(Good) |

The above results confirm that, in Examples, the color gamut of a secondary color image is enhanced and a suitable transfer efficiency is achieved compared with Comparative examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developing toner comprising a toner particle including:

a binder resin;

a colorant;

an alkali metal; and an alkaline-earth metal, wherein a net intensity $N_S$ of sulfur included in the toner particle and a total net intensity $N_A$ of the alkali metal and the alkaline-earth metal included in the toner particle, the net intensity $N_S$ and the net intensity $N_A$ being measured by X-ray fluorescence analysis, satisfy $1.0<N_S/N_A<22.0$, the net intensity $N_S$ of sulfur is 3.5 kcps or more and 5.5 kcps or less, and the net intensity $N_S$ of sulfur and a net intensity $N_M$ of Mg included in the toner particle, the net intensity $N_M$ being measured by X-ray fluorescence analysis, satisfy $15.0<N_S/N_M<22.0$.

2. The electrostatic image developing toner according to claim 1, wherein the net intensity $N_S$ of sulfur and the total net intensity $N_A$ of the alkali metal and the alkaline-earth metal satisfy $1.0<N_S/N_A<18.0$.

3. The electrostatic image developing toner according to claim 1, wherein the total net intensity $N_A$ of the alkali metal and the alkaline-earth metal is 0.2 kcps or more and 4.2 kcps or less.

4. The electrostatic image developing toner according to claim 3, wherein the total net intensity $N_A$ of the alkali metal and the alkaline-earth metal is 2.0 kcps or more and 4.0 kcps or less.

5. The electrostatic image developing toner according to claim 1, wherein a net intensity $N_{Cl}$ of chlorine included in the toner particle, the net intensity $N_{Cl}$ being measured by X-ray fluorescence analysis, is 0.10 kcps or more and 1.30 kcps or less, and wherein the net intensity $N_S$ of sulfur and the net intensity $N_{Cl}$ of chlorine satisfy $3<N_S/N_{Cl}<40$.

6. The electrostatic image developing toner according to claim 1, wherein the alkali metal and the alkaline-earth metal include at least one element selected from the group consisting of Na, Mg, and Ca.

7. The electrostatic image developing toner according to claim 1, wherein the binder resin included in the toner particle includes an amorphous polyester resin and a crystalline polyester resin.

8. The electrostatic image developing toner according to claim 7, wherein the crystalline polyester resin is a polymer of an α,ω-linear aliphatic dicarboxylic acid with an α,ω-linear aliphatic diol.

9. The electrostatic image developing toner according to claim 8, wherein the polymer of an α,ω-linear aliphatic dicarboxylic acid with an α,ω-linear aliphatic diol is a polymer of 1,10-decanedicarboxylic acid with 1,6-hexanediol.

10. The electrostatic image developing toner according to claim 1, wherein the toner particle includes a release agent.

11. The electrostatic image developing toner according to claim 10, wherein the release agent includes an ester wax.

12. The electrostatic image developing toner according to claim 1, wherein, when a cross section of the toner particle is observed, an area fraction of a region in which the colorant is dispersed to the cross section of the toner particle is 60% or more and 95% or less.

13. An electrostatic image developing toner comprising a toner particle including:

a binder resin;

a colorant;

an alkali metal, and an alkaline-earth metal, wherein a difference between a net intensity $N_S$ of sulfur included in the toner particle and a total net intensity $N_A$ of the alkali metal and the alkaline-earth metal included in the toner particle, the net intensity $N_S$ and the net intensity $N_A$ being measured by X-ray fluorescence analysis, satisfies $0.8<N_S-N_A<5.0$, the net intensity $N_S$ of sulfur is 3.5 kcps or more and 5.5 kcps or less, and the net intensity $N_S$ of sulfur and a net intensity $N_M$ of Mg included in the toner particle, the net intensity $N_M$ being measured by X-ray fluorescence analysis, satisfy $15.0<N_S/N_M<22.0$.

14. An electrostatic image developer comprising:

the electrostatic image developing toner according to claim 1.

* * * * *